Sept. 6, 1960 G. B. ERSKINE ET AL 2,951,933
MACHINE AND METHOD FOR THE MANUFACTURE OF STUDDED ELECTRODES
Filed Oct. 3, 1957 12 Sheets-Sheet 1

INVENTORS
GEORGE B. ERSKINE
BY STANLEY J. GARTNER
Amster + Levy
ATTORNEYS

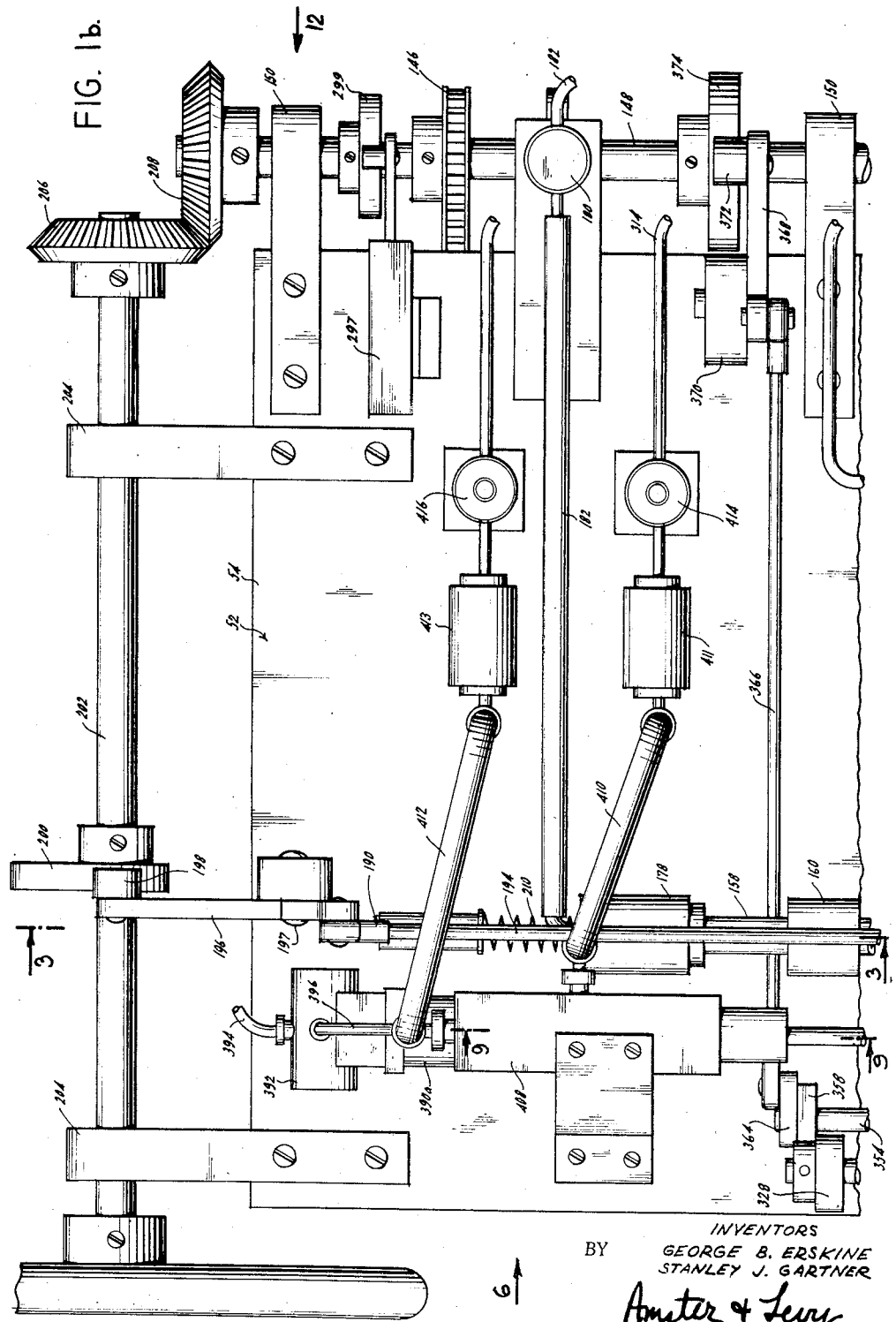

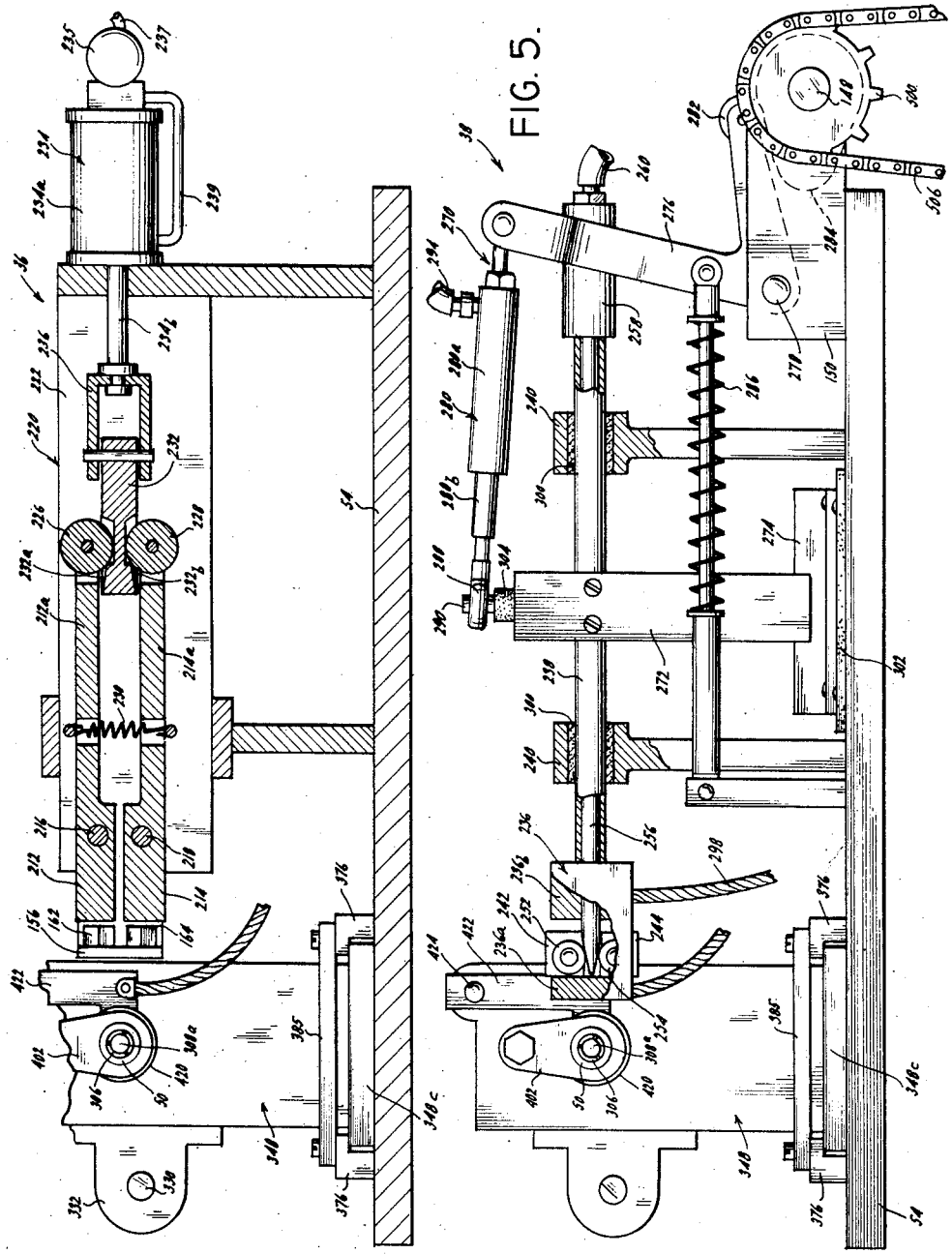

Sept. 6, 1960  G. B. ERSKINE ET AL  2,951,933
MACHINE AND METHOD FOR THE MANUFACTURE OF STUDDED ELECTRODES
Filed Oct. 3, 1957  12 Sheets-Sheet 6

INVENTORS
GEORGE B. ERSKINE
STANLEY J. GARTNER
BY
Amster + Levy
ATTORNEYS

Sept. 6, 1960    G. B. ERSKINE ET AL    2,951,933
MACHINE AND METHOD FOR THE MANUFACTURE OF STUDDED ELECTRODES
Filed Oct. 3, 1957    12 Sheets-Sheet 7

FIG. 7.

INVENTORS
GEORGE B. ERSKINE
STANLEY J. GARTNER
BY

Amster + Levy
ATTORNEYS

Sept. 6, 1960 G. B. ERSKINE ET AL 2,951,933
MACHINE AND METHOD FOR THE MANUFACTURE OF STUDDED ELECTRODES
Filed Oct. 3, 1957 12 Sheets-Sheet 8

INVENTORS
GEORGE B. ERSKINE
BY STANLEY J. GARTNER

Amster + Levy
ATTORNEYS

Sept. 6, 1960  G. B. ERSKINE ET AL  2,951,933
MACHINE AND METHOD FOR THE MANUFACTURE OF STUDDED ELECTRODES
Filed Oct. 3, 1957  12 Sheets-Sheet 12

INVENTORS
GEORGE B. ERSKINE
STANLEY J. GARTNER
BY
Amster & Levy
ATTORNEYS

United States Patent Office 2,951,933
Patented Sept. 6, 1960

2,951,933

MACHINE AND METHOD FOR THE MANUFACTURE OF STUDDED ELECTRODES

George B. Erskine, R.D. 1, and Stanley J. Gartner, 75 Broad St., both of Emporium, Pa.

Filed Oct. 3, 1957, Ser. No. 687,913

25 Claims. (Cl. 219—79)

The present invention relates to an improved machine and method for the manufacture of studded electrodes, and in particular to an improved method for mounting one or more groups of radially-extending, circumferentially-spaced studs on an electrode body and to an automatic machine for achieving such mounting.

In the electron gun assembly of a wide variety of cathode ray tube devices, such as television picture tubes, it is necessary to employ a series of electrodes maintained at prescribed operating potentials to form, focus and direct the electron beam. Such electrodes usually take the form of cup-like or sleeve-like electrode bodies each having a number of radially-extending mounting studs or pins welded to their outer peripheries at circumferentially-spaced locations. The studs or pins are usually disposed in groups spaced axially of the electrode body and provide a means by which the electrodes can be mounted in the neck section of the tube envelope. The mounting of the electrodes in the tube envelope is usually achieved by embedding flattened terminal portions of the studs in supporting rods of glass or similar thermoplastic material which serve to mount the several electrodes in the required orientation relative to each other and to the remaining components of the electron gun assembly.

It has been the general practice in the industry to construct these and other similar types of electrodes by a series of manual operations involving the use of assembly jigs and fixtures. To illustrate a typical hand assembly operation, the electrode body is supported on a jig and successive studs or pins are manually assembled with the electrode body, frequently by the use of an appropriate jig or fixture, and thereafter welded to the surface of the electrode body with the aid of a conventional bench welder. This hand method, by its very nature, is time consuming, tedious, painstaking, and necessitates multiple handlings of the studs and electrode bodies incident to achieving the final assembly. Usually, the studs are made in a first and separate operation, brought to the bench welder, and thereafter assembled as previously described. Apart from the problems attendant to the hand method of manufacture, the final electrode is frequently unsatisfactory in quality and often does not come up to accepted commercial standard. For most applications, it is essential that the mounting studs be precisely located both circumferentially and axially of the electrode body. The difficulty in obtaining a precision assembly within the prescribed tolerances established by the industry may be appreciated by considering a typical electrode which incorporates two groups of spaced studs each consisting of three studs spaced circumferentially at 120° intervals. Not only is it necessary to maintain close tolerance in the spacing of the studs in the respective groups, but it is also necessary to maintain accurate spacing and alignment between the groups. The overall problem is further complicated by the necessity of having very strong joints between the respective studs and the electrode body and by the inherent problems attendant to handling parts which are comparatively small in size, the mounting studs often being as small as one quarter of an inch in overall height.

It is broadly an object of the present invention to provide an improved method and machine for the manufacture of studded electrodes of the aforesaid type. Specifically, it is within the contemplation of the present invention to provide a highly versatile bench-type of automatic machine for forming studs and welding successive formed studs to a sleeve-like electrode body in a prescribed pattern.

From time to time, as the design of gun assemblies change and as new components are developed incorporating such electron gun assemblies, it is necessary to handle different size electrode bodies and to weld one or more groups of radially-extending, circumferentially-spaced studs to the electrode bodies with different circumferential spacing between the studs of each group and different axial spacing between the groups. For example, some assemblies may require an electrode body having two, three or four studs about a circumferential path, with one, two or three such groups at varying spacings along the length of the electrode body. To meet such situations as they are encountered, without the necessity of completely reconstructing and redesigning the machine, it is quite important that the machine be readily convertible from one type of operation to another in a comparatively short change-over time, with the replacement of relatively few parts in the machine.

It is a further object of the present invention to provide an improved method and machine for the manufacture of studded electrodes which is exceptionally versatile and readily adapted to weld studs to electrode bodies of different sizes in many different arrays.

Advantageously, our improved machine may be attended by a single operator who merely places successive electrode bodies on a work-supporting mandrel. The very nature of our mechanisms establishes a high order of accuracy in the forming and welding of successive studs and enables the mass production of studded electrodes of high quality and at comparatively low unit cost.

In accordance with method aspects of the present invention, electrodes of the type including one or more radially-extending studs welded to an electrode body are manufactured by cutting off a length of wire to form a stud, swaging the rearward end of the stud to form a flattened ear or terminal, bringing the forward end of the stud into contact with the electrode body with the stud extending radially of the body, and welding the stud to the body. Thereupon, the electrode body is axially rotated through a prescribed angular traverse corresponding to the desired circumferential spacing between the successive studs and the enumerated steps are repeated to form and weld a further stud to the body at a location circumferentially spaced from the first stud. The operation is repeated, if needed, to join one or more further studs to the electrode body. If the particular studded electrode is to embody a further row or group of radially-extending studs, the body is displaced axially through a distance corresponding to the desired spacing between the groups and the assembly steps are repeated to weld one or more further studs to the body at circumferentially spaced locations displaced axially from the first group of studs.

An illustrative machine embodying features of the present invention for the manufacture of studded electrodes of the type including a cylindrical electrode body having a group of circumferentially-spaced, radially-extending studs welded thereto comprises a mandrel mounted for axial rotation and adapted to receive the electrode body to rotate the same whereby successive spaced locations about a circumferential path are brought into a welding position. Stud forming and transfer mechanisms are arranged to form and transfer successive studs into contact with the body as the spaced locations about the circumferential path are brought into the welding position. An indexing drive is operatively connected to the mandrel for indexing the same through a prescribed angular traverse in timed relation to operation of the stud forming and transfer mechanisms. Finally, appropriate means are provided for applying welding current to successive studs brought into the welding position. In the event that the cylindrical body is to include a further group of circumferentially-spaced, radially-extending studs welded thereto, the mandrel is mounted so that it may be displaced from its first position axially through a prescribed stroke to a second position wherein the mandrel can be indexed, as in the first instance, to bring spaced locations about the second circumferential path into a welding position to receive successive studs.

The above brief description, as well as further objects, features, advantages and applications of the present invention will best be appreciated by reference to the following detailed description of a presently preferred method and machine, when taken in conjunction with the accompanying drawings wherein:

Figs. 1a and 1b, which are to be placed side by side on the broken lines indicated at the respective margins to make up Fig. 1 is a plan view of a machine for the manufacture of studded electrodes embodying features of the present invention;

Fig. 4 is an elevational view, taken substantially 4—4 of Fig. 1, with parts broken away and sectioned and looking in the direction of the arrows, showing details of the stud-swaging mechanisms;

Fig. 5 is an end elevational view, with parts broken away and sectioned, taken in direction of the arrow 5 in Fig. 1 and showing the details of the weld transfer mechanisms;

Fig. 7 is a horizontal section, taken substantially along the lines 7—7 of Fig. 6 with certain parts omitted, showing the relationship between the wire feeding, stud transfer, stud swaging, and weld transfer mechanisms, as well as details of the mandrel and its associated actuating and operating mechanisms;

Figure 15:
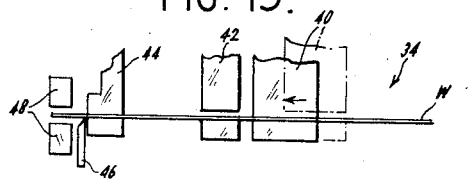
Figure 16:
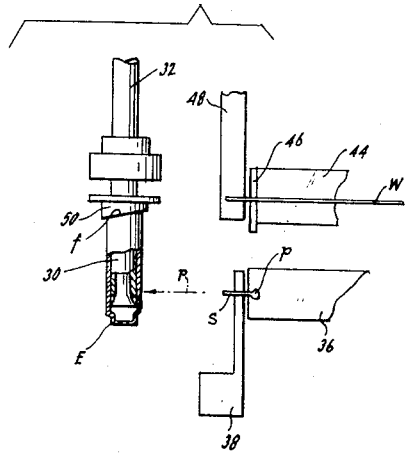
Figure 17:
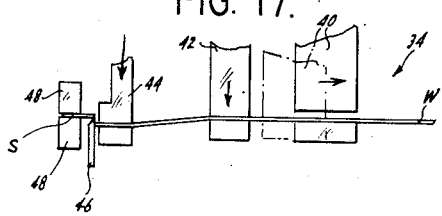
Figure 18:
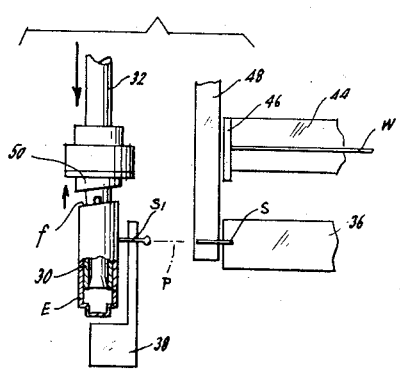
Figure 19:
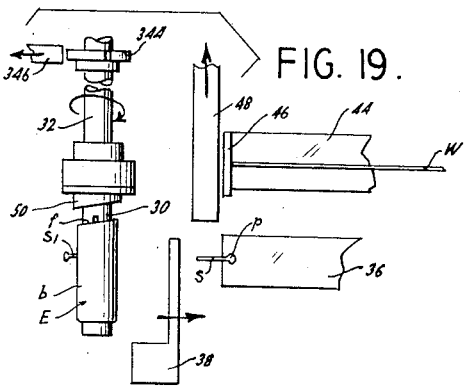
Figure 20:
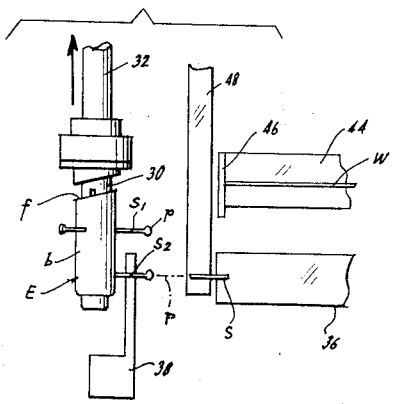
Figure 21:
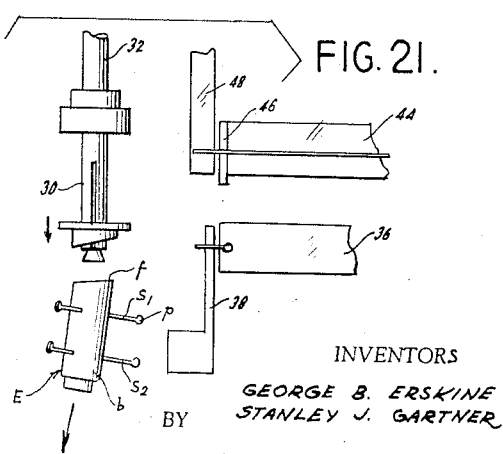

Figs. 15 to 21, inclusive, are diagrammatic showings of some of the essential operating mechanisms of the machine in their related positions of movement during a typical sequence of operation for the formation of a studded electrode, to wit:

Fig. 15 shows the relative position of the feeding device, the clamping device, the cutting tools and the transfer jaws after feed of a length of wire into position for cutting;

Fig. 16 shows the relationship of the stud forming mechanism of Fig. 15 to the swaging and weld transfer mechanisms and the mandrel at the start of a stud forming and welding cycle;

Fig. 17 is a view similar to Fig. 15, but showing the relation of the parts after cut-off of a length of wire corresponding to one stud;

Fig. 18 is a view similar to Fig. 16, showing a swaged stud moved by the weld transfer mechanism into contact with the electrode body supported on the mandrel, the next stud having been advanced to the swaging station;

Fig. 19 is a view at a time later in the cycle illustrating the indexing of the mandrel, the return of the weld transfer mechanism to pick up a further stud at the swaging station, and the return of the stud transfer mechanism to permit the formation and pickup of the next stud;

Fig. 20 is a view similar to Figs. 18 and 19, but at a time later in the cycle and after the mandrel has been axially displaced to bring a further circumferential path of the electrode body into position to receive a group of radially-extending, circumferentially-spaced studs; and Fig. 21 is a view similar to Fig. 20, but showing a completed studded electrode being ejected with the stud and weld transfer mechanisms in position for the next sequence of operations on an electrode body to be placed upon the mandrel.

Preliminary to a detailed consideration of the present machine for the manufacture of studded electrodes, as shown specifically in Figs. 1 to 14, inclusive, brief reference will be made to Figs. 15 to 21, inclusive, for a general description of the function and operation of the several mechanisms incorporated into the present machine and their relationship to facilitate a more thorough understanding of the detailed description as the same proceeds.

A typical studded electrode which may be manufactured in the present machine is shown in Fig. 21 and is generally designated by the letter E. Such studded electrode E includes a generally cylindrical electrode body 6 which terminates in a rear face $f$ which is cut at a slant angle to occupy a plane which is skewed relative to a transverse section through the electrode body. In this illustrative studded electrode E, first and second groups of studs $s_1$, $s_2$ are welded to the electrode body $b$. The three studs of the group $s_1$ each extend radially and are circumferentially spaced relative to each other by 120°; while the three studs of the second group $s_2$ are similarly spaced at 120° intervals, with respective pairs of studs of the first and second groups aligned with each other. This type of studded electrode is typical, but illustrative, of the many and varied types which may be manufactured by the present machine.

The machine incorporates a mandrel 30 which is adapted to receive the electrode body b and means including a supporting shaft 32 mounting the mandrel 30 for axial rotation to bring prescribed space locations about the circumference of the electrode body into a welding position. Specifically, the assembly of the mandrel 30 and its supporting shaft 32, as well as further components hereinafter described, are mounted for axial rotation in a first position (see Figs. 18 and 19) whereby successive locations along a first circumferential path about the electrode body may be brought into a welding position, generally designed by the letter P. Further, the mandrel 30 and the shaft 32 may be retracted, as indicated by the directional arrow in Fig. 20, whereby successive locations along a further circumferential path about the electrode body b may be brought into the welding position P (see Figs. 20 and 21).

Stud forming and transfer mechanisms, generally designated by the reference numerals 34, 48 (shown in detail in Fig. 2), are provided at a location laterally offset from the welding position P for cutting successive studs s from a continuous length of wire W and for thereafter transferring the successive lengths of wire laterally to swaging mechanisms, generally designated by the reference numeral 36 (shown in detail in Fig. 4). The swaging mechanisms 36 are arranged to flatten the rearward ends of successive studs to provide ear-like projections or terminal portions p. Weld transfer mechanisms, generally designated by the reference numeral 38, are arranged to pick up successive swaged studs at the swaging mechanisms or station 36 and to transfer the same through an axial thrust at the weld position P toward and into contact with the electrode body b supported on the mandrel 30.

The stud forming and transfer mechanisms 34, 48 include a feeder 40, a clamping device 42 and a movable cutting die 44 arranged along the wire feed path in succession, a stationary cutter 46 adapted to cooperate with the cutting die 44, and stud transfer jaws positioned to receive successive sections of cutoff wire for support and subsequent transfer to the swaging mechanisms 36.

Mounted on the mandrel 30 is a combined reference and stripping flange or shoulder 50 which is normally in the extended position illustrated in the Fig. 16. The flange 50 provides a stop against which the electrode body b with the slant rear face f can be oriented by the operator when placing electrode body b on to the mandrel 30. After locking of the part on the mandrel, by mechanisms to be subsequently described, the combined reference and stripping flange 50 moves to the retracted position illustrated in Figs. 18, 19 and 20, in which position the flange 50 does not interfere with the indexing of the mandrel to bring the prescribed locations about the first and second circumferential paths into position to receive the studs. Finally, the combined reference in stripping flange 50 is adapted to move through a forward stroke, as may be seen in Fig. 21, whereby the studded electrode is stripped from the mandrel.

Brief reference will now be made to this group of figures to describe the successive operations in the studding of an electrode body. Referring to Figs. 15 to 17, inclusive, when the machine is placed in operation, the feeding device 40 closes on the wire W at the dotted line position illustrated in Fig. 15, and then advances through a forward stroke to move a prescribed length of the wire through the movable cutting die 44 and into position to be engaged by the stud transfer jaws 48. The clamping device 42 closes to grip the wire W for cut-off and the transfer jaws 48 close on the stud forming section S to grip the same. As seen in Fig. 17, the cutting die 44 moves laterally relative to the stationary cutter 46 to cut off the prescribed sections of the wire W, and during this time the feeding device 40 is opened and returns to the retracted position (corresponding to the dotted showing in Fig. 15) for feed of the next length of wire into position for cut-off and transfer.

After the length of wire S is cut off, the closed stud transfer jaws 48 advance laterally through a prescribed stroke from the retracted position illustrated in Fig. 16, to the advanced position illustrated in Fig. 18, in which the rearward end of the stud S is engaged by the swaging mechanisms to form the flattened ear or projection p. When the stud transfer jaws 48 are in the advanced position of Fig. 18, the weld transfer jaws 38 are in position to hold the previously formed stud against the electrode body b for the welding operation. As will be detailed hereinafter, the swaging mechanisms 36 include swaging jaws which close on the rear end of the stud while held by the stud transfer jaws 48. After the swaging operation is completed, the swaging jaws support the stud by its swaged end whereby the stud transfer jaws are able to retract, as indicated by the directional arrows in Fig. 19, and the weld transfer jaws 38 are able to move into the pickup position of Fig. 16, as indicated by the directional arrow in Fig. 19.

Referring now to Figs. 18 and 19, after the first stud is welded to the electrode body B and the weld transfer jaws 38 begin to return to the pickup position in relation to the swaging mechanisms 36, the mandrel 30 indexes through a prescribed angular traverse to bring a further location along the first circumferential path into alignment with the weld line or path P to receive the next stud formed within the machine. In the illustrative construction, a group of three studs $S_1$ are welded along the first circumferential path at intervals of 120°.

After the first group of studs are welded to the electrode body, appropriate mechanisms connected to the mandrel supporting shaft 32 retract the mandrel through a prescribed rearward stroke, as may be seen by progressively inspecting Figs. 19 and 20. This brings a second circumferential path axially spaced from the first circumferential path into position to have successive spaced locations about the second circumferential path brought into the welding position P. With the mandrel 30 in the retracted position of Fig. 20, the stud forming and welding operations are repeated to weld the desired number of studs about the periphery of the electrode body along the second circumferential path. In this illustrative embodiment, a group of three studs $s_2$ are welded to the electrode body b at 120° intervals, with the respective studs of the second group $s_2$ in alignment with the respective studs of the first group $s_1$.

Upon completion of the second group of studs, the combined reference and stripping flange 50 moves through a forward stroke, after unlocking of the mandrel, to strip the studded electrode E from the mandrel, as seen in Fig. 21. Upon completion of the stripping action, the flange 50 returns to the reference position illustrated in Fig. 16. Thereupon, the operator places the next electrode body b on to the mandrel and again initiates the operation of the machine.

Figure 1A:
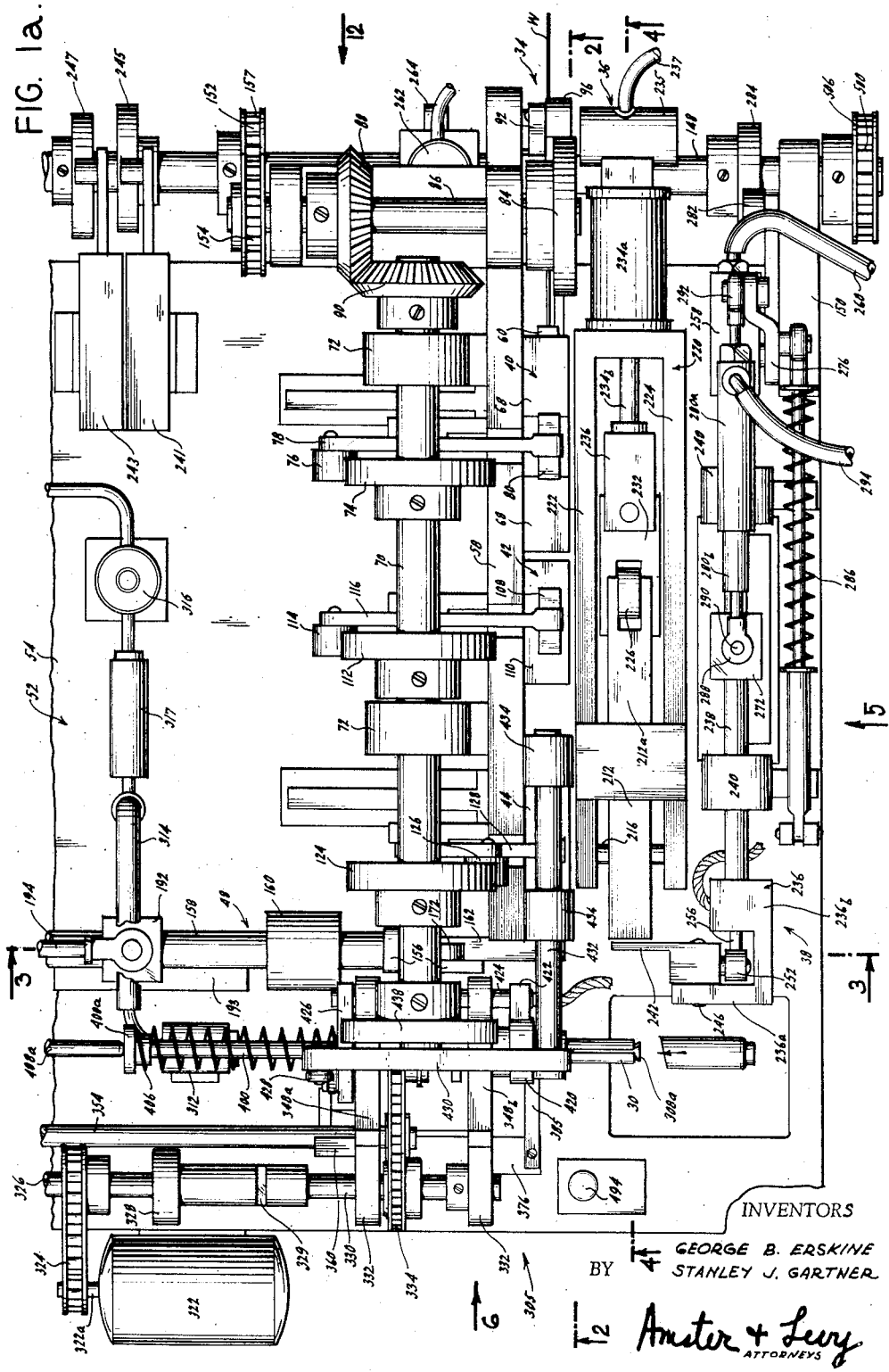

Referring now to Figs. 1 to 14 of the drawings, detailed reference will be made to the several coordinated mechanisms for studding electrodes in accordance with the present invention. As seen in Figs. 1 (Figs. 1a and 1b) and 12, the machine includes a bench-like support 52 having a bed plate 54 supported on a number of depending legs 56. Extending from front to rear of the machine is an upstanding wall 58 which along with the bed plate 54 serves to support the various machine components. The numerals employed heretofore, in conjunction with Figs. 15 to 21 to generally identify the various mechanisms, will be likewise employed in the following detailed description to identify such mechanisms.

Figure 2:
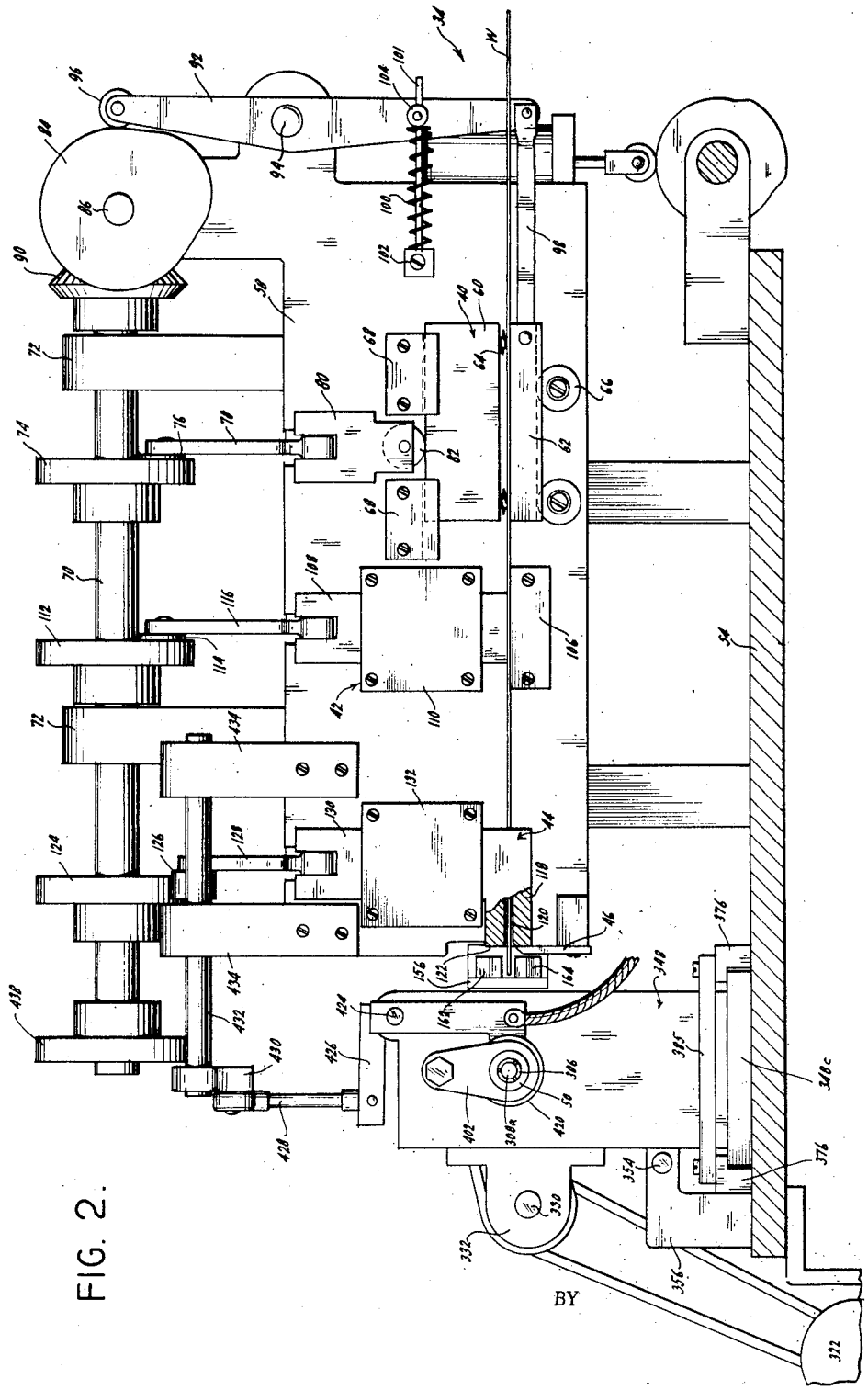
Fig. 2 is an elevational view, with parts broken away and sectioned, taken along the line 2—2 of Fig. 1 and looking in the direction of the arrows, showing the details of the wire feeding and stud forming and transfer mechanisms incorporated in the machine.

Referring now specifically to Figs. 1 and 2, the stud forming and transfer mechanisms 34 are seen to be located along the upstanding wall 58 intermediate the wall 58 and the swaging mechanisms 36. The feeder 40, the clamping device 42 and the movable cutting die 44 are mounted one after another on the upstanding supporting wall 58 and act upon the stud wire W which is fed from a coil or similar supply (not shown), from right to left in Fig. 2, that is, from the rear of the machine toward the front thereof. The feeder is in the form of a laterally movable feeding head having upper and lower jaws 60, 62 mounted for movement as a unit through a predetermined stroke along the length of the wire W to feed a prescribed section s thereof beyond the forward end of the cutting die 44. The action of the feeding head 60, 62 is to close upon the wire W, feed through a forward stroke, open, and return to the starting position for feed of the next length of wire. Such action may be recognized as the familiar four-motion feeding. In the position illustrated in Fig. 2, the feeding head has completed the feed of a section of wire W, the jaws are open and the head has returned to its starting position. The upper feeding jaw 60 is mounted on the lower feeding jaw 62 by upstanding posts and is biased away from the lower feeding jaw 62 by one or more interposed springs 64. The feeding head 40 is mounted for its forward feeding motion and its return by roller supports 66 pivotally mounted on the wall 58 which engage within a track in the undersurface of the lower feeding jaw 62 and guide blocks 68 fixed to the wall 58 which are formed with a track receiving the upper end of the upper feeding jaw 60.

The feeder 40 is controlled and coordinated into the overall machine system from an auxiliary cam shaft 70 which is journaled on a number of appropriate bearings 72. The auxiliary cam shaft 70, which is driven from the main motor of the machine as will be subsequently described, controls both the opening and closing of the jaws 60, 62 of the feeding head 40 and the thrust and return of the feeding head. Specifically, the cam shaft 70 carries a jaw operating cam 74 which is engaged by a cam follower 76 pivotally carried on a cam follower arm 78. The cam follower arm 78 is pivotally connected to a bifurcated operating member 80 which is slidably supported on the upstanding supporting wall 58 and has a roller contact 82 with the upper jaw 60 of the feeding head intermediate the guide blocks 68. The development of the jaw operating cam 74 is selected to close the jaw 60 prior to the beginning of a feeding cycle and to open the jaw 60 at the end of the feeding cycle in appropriate time relation to the advance and return of the feeding head 40. The advance and return of the feeding head is achieved from a head actuating cam 84 which is coupled to the auxiliary cam shaft 70 and to the main drive. As seen in Fig. 1a, the cam 84 is disposed at right angles to the cam 74 and is supported on a coupling shaft 86 connected via meshing bevel gears 88, 90 to the main drive and to the auxiliary cam shaft 70. The head control cam 84 is connected to the feeding head 40 by a double-armed lever 92 which is pivoted at 94 on the supporting wall 58 and has a follower 96 at its upper end in engagement with the cam 84. The lower end of the double-armed lever 92 is pivotally connected via a coupling link 98 to the lower jaw 62 of the feeding head 40. The feeding head 40 is biased into its return or retracted position by a spring 100 supported on a rod 101 which is connected between a stationary abutment 102 on the supporting wall 58 and a further abutment 104 carried on the lower arm of the double-armed lever 92. The development of cam 84 is selected such that during each stud-forming cycle the double-armed lever 92 is rocked about its pivot 94 in the direction appropriate to thrust the coupling link 98 forward (to the left in Fig. 2) through a prescribed feeding stroke against the biasing effect of the spring 100. The length of stud wire fed from the supply during each stud forming cycle may be accurately controlled by appropriate coordination and development of the cams 74, 84, as is understood by those skilled in the art.

Next along the path of the advancing wire W is the clamping device 42 which is shown in the closed position in Fig. 2 preparatory to cut-off of a length of the stud forming wire. The clamping device 42 includes a lower stationary clamping jaw 106 fixed to the supporting wall 58 with its upper face in alignment with the upper face of the feeding jaw 62, and a movable clamping jaw 108 which is mounted for vertical reciprocation on the supporting wall 58 by appropriately formed guide block 110. The movable clamping jaw 108 is closed down on the wire W and against the stationary clamping jaw 106 at the appropriate time in the stud forming cycle by a cam 112 carried on the auxiliary cam shaft 70 and coupled to the movable clamping jaw 108 by a cam follower 114 carried on a cam follower arm 116 which is pivotally connected to the upper bifurcated end of the clamping jaw 108. Closing of the upper clamping jaw 108 provides an accurate stop which precludes axial displacement of the wire W prior to and during cut-off whereby the length of the stud may be accurately established and controlled.

Next along the wire feeding path is the movable cutting die 44 which includes a die body 118 having a bore 120 for the wire W. The bore is substantially in the plane of the upper faces of the jaw 62, 106. The bore 120 opens into a vertically-extending cutting face 122 which cooperates with the stationary cutter 46 to cut off the section of the wire advanced beyond the cutting face 122 in response to downward displacement of the movable cutting die 44. The cutting die 44 is moved downwardly through the prescribed cutting stroke under the control of a cutter operating cam 124 carried on the auxiliary cam shaft 70. The cam 124 is engaged by a follower 126 which is carried on a cam follower arm 128 pivotally connected to a bifurcated rigid extension 130 on the die body 118. The extension 130 is mounted for vertical reciprocation on the supporting wall 58 by an appropriately formed guide block 132. It will be appreciated that appropriate springs (not shown) are operatively connected to the respective cam follower arms 78, 116 and 128 to bias the followers against their associated cams.

Figure 12:
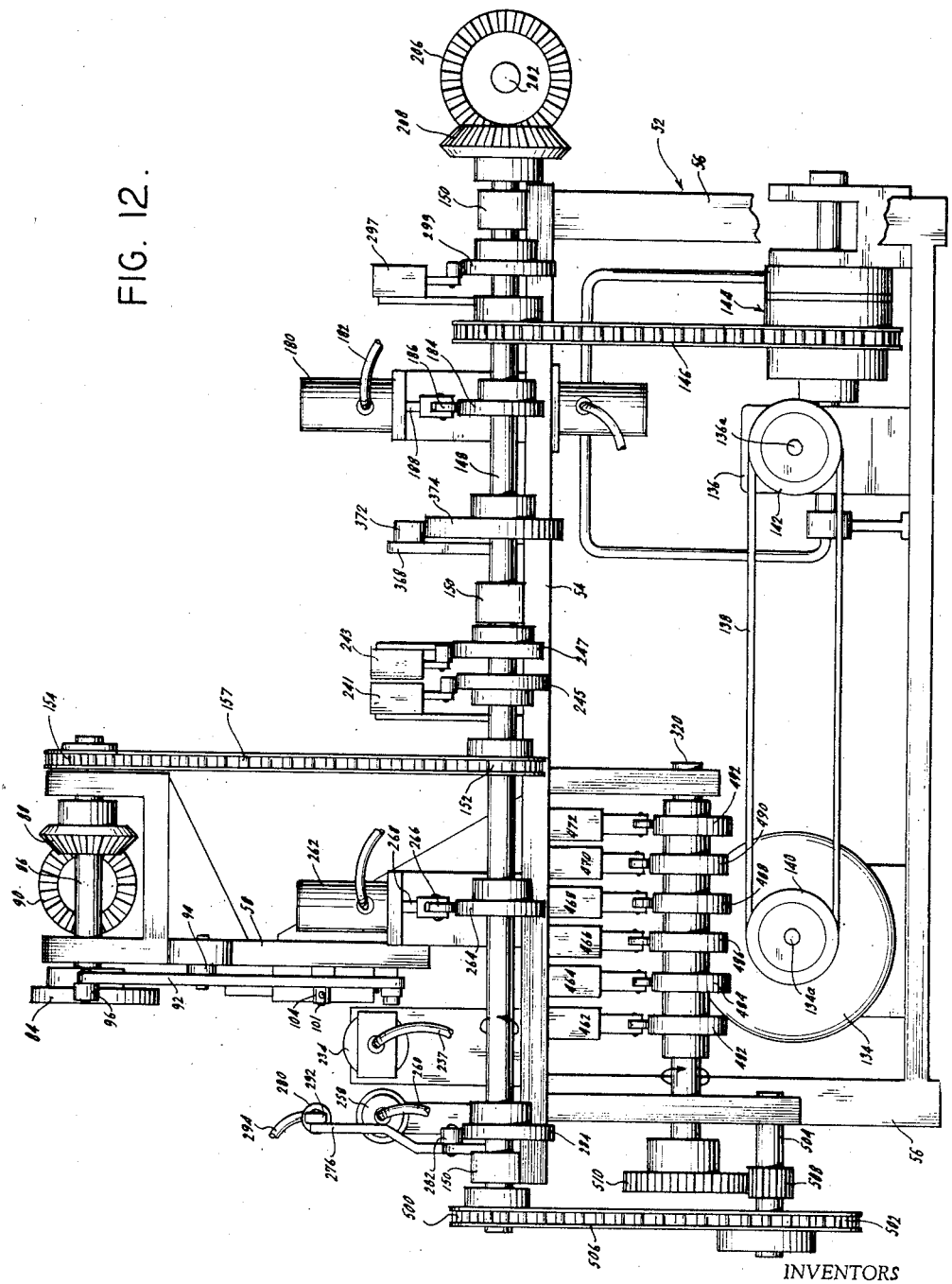
Fig. 12 is a rear elevational view of the machine, taken from the right of Fig. 1 and in the direction of the arrow 12.

Reference will now be made to Figs. 1 and 12 for a description for the drive of the intermeshing beveled gears 88, 90 which rotate the auxiliary cam shaft 70 and the auxiliary coupling shaft 86 for the cams 74, 84, 116 and 124 of the stud forming mechanisms. As seen in Fig. 12, a main motor 134 is mounted beneath the bed-plate 54 on the supporting frame 52 and has its output shaft 134a coupled to the input shaft 136a of a reduction gearing unit 136 via a belt 138 trained over the pulleys 140, 142 connected to the respective shafts 134a, 136a. The output shaft of the reduction gearing unit 136 is connected to a pneumatic brake and clutch, generally designated by the numeral 144, which has an output driving sprocket coupled to a chain 146 which is also trained about a driven sprocket carried on the main cam shaft 148. The main cam shaft 148 is journaled on the bed-plate 54 by appropriate bearings 150 and is rotated once during each stud forming, transfer and welding cycle and coordinates many of the inter-related mechanisms which operate during such cycle. If for example six studs are to be welded to an electrode body, the shaft 148 will make one revolution for each sequence of operations required to form, transfer and weld one of the studs. Thus the main cam shaft 148 will make six revolutions from start to finish of the illustrated overall machine cycle. The main cam shaft 148 carries a driving sprocket 152 which is connected to a driven sprocket 154 on the coupling shaft 86 by a chain 157. As previously detailed, the coupling shaft 86 carries the bevel gear 88 which meshes with the bevel gear 90, thereby imparting drive to the auxiliary cam shaft 70 of the stud forming mechanisms.

Figure 3:
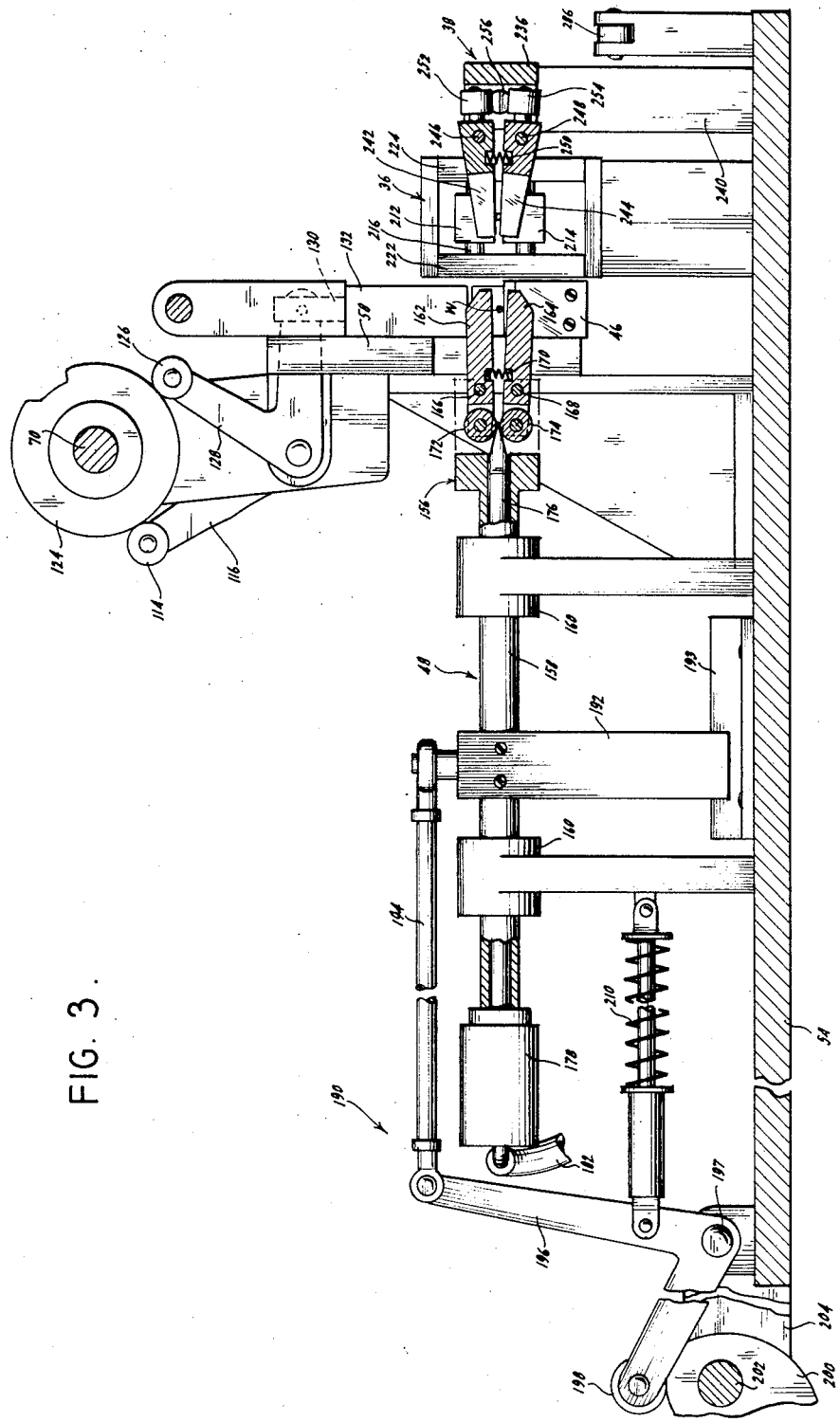
Fig. 3 is an elevational view with parts broken away and sectioned, taken substantially along the line 3—3 of Fig. 1 and looking in the direction of the arrows, showing the details of the stud transfer and weld transfer mechanisms.
Figure 6:
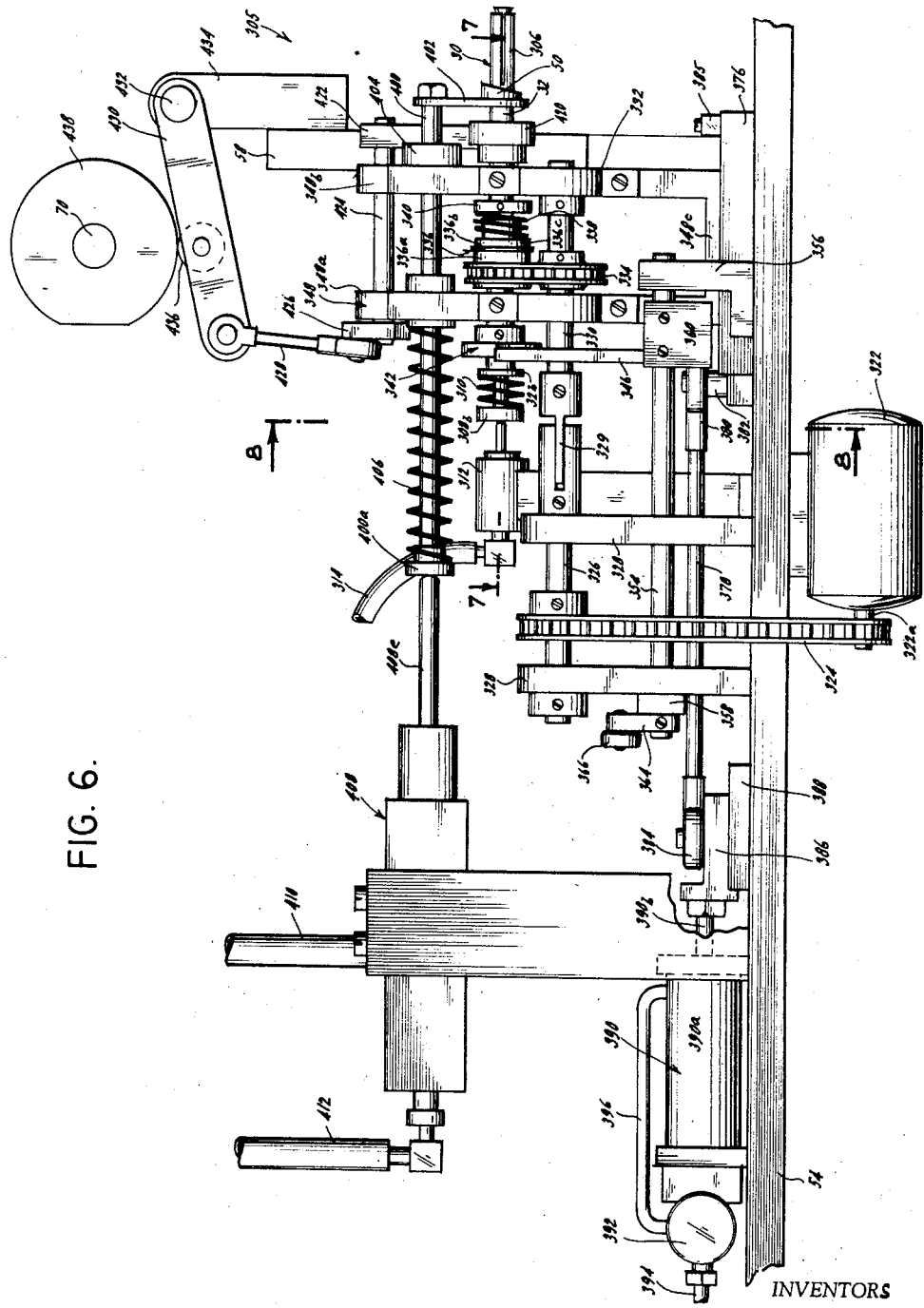
Fig. 6 is a front elevational view, taken from the left of Fig. 1 and in the direction of the arrow 6, showing the details of the work-supporting mandrel, its supporting carriage and the associated actuating and operating mechanisms.
Figure 8:
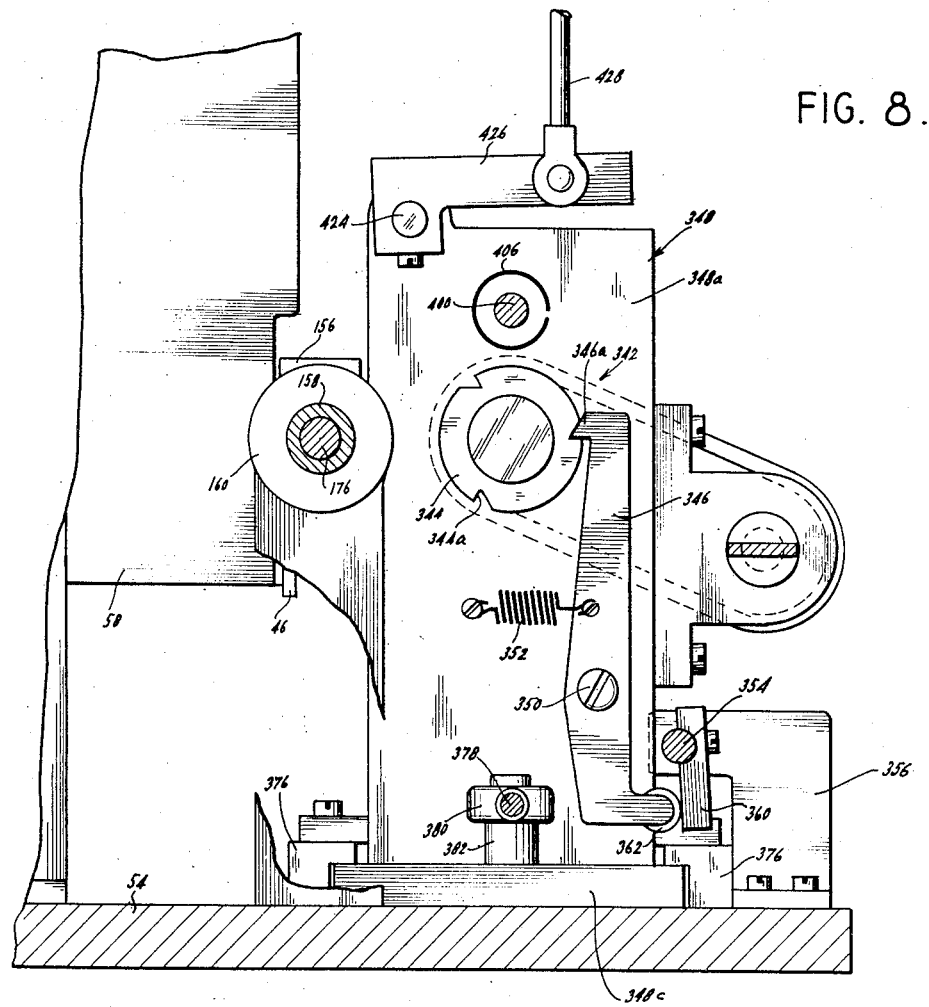
Fig. 8 is a transverse elevational view, taken substantially along the line 8—8 of Fig. 6 and looking in the direction of the arrows, showing the details of the indexing and actuating mechanisms for the mandrel.

Detailed reference will now be made to Figs. 1 and 3 for a description of the stud transfer mechanisms 48 which incorporate stud transfer jaws arranged to support the successive lengths of the stud wire W fed through the cutting die 44 for cut-off and to laterally transfer successive studs into position for engagement and support by the swaging mechanisms 36 while along the thrust line or path P. The stud transfer mechanisms 48 include a stud transfer head 156 which is supported on the bed-plate 54 of the machine for lateral movement across the wire feed path through a transfer stroke. The stud transfer head 156 is carried on a hollow supporting shaft 158 which is journaled on bearings 160 carried by the bed-plate 54 of the machine. As seen in Fig. 3, the stud transfer head 156 includes a pair of stud transfer jaws 162, 164 which are mounted on the head at pivots 166, 168. The forwardly-extending stud-engaging portions of the jaws 162, 164 are biased apart by an interposed spring 170. Pivotally mounted on the rearward end of the jaws 162, 164 are respective jaw-closing rollers 172, 174 which are separated by a thrust member 176 slidable within the supporting shaft 158 and having divergent camming surfaces on its forward end. In response to movement of the thrust member 176 to the right in Fig. 3 through a prescribed stroke, the divergent camming surfaces are effective to urge the rollers 172, 174 apart, thereby closing the jaws 162, 164 on the length of stud wire against the reaction force of the spring 170. The thrust member 176 is driven through its prescribed stroke to cause the jaws 162, 164 to pick up successive lengths of wire at the wire cut-off location by a pneumatic control 178 incorporating an air cylinder and piston which is operated from a source of compressed air via valve 180 in the inlet conduit 182. The inlet conduit 182 is connected to the appropriate source of air under pressure as will be detailed hereinafter, and the timed valving of the air to the piston and cylinder 178 is achieved via the air valve 180 which is opened and closed by a cam 184 on the main cam shaft 148. As seen in Fig. 12, the cam 184 is engaged by a follower 186 carried on a follower arm 188 which in turn controls the opening and closing of the air valve 180. The air valve 180 is of the type that is normally closed and is opened in response to an upward thrust imparted to the cam follower arm 188 as the rise portion of the cam 184 is presented to the cam follower 186. Further details of this control will be more fully appreciated during the detailed description of the schematic diagrams of Figs. 13 and 14.

Returning again to Fig. 3, after the stud transfer jaws 162, 164 close upon the cut-off lengths of stud wire W, the transfer head 156 moves through its required forward stroke under control of its actuating mechanisms, generally designated by the reference numeral 190. The transfer actuating mechanisms 190 include a coupling member 192 fixed to the shaft 158 and guidingly engaged at its lower end by a guide rail 193 on the bed-plate 54 such that the shaft 158, the head 156 and the pneumatic control 178 for the jaws may be advanced through the required stroke. The coupling member 192 is pivotally connected via an adjustable coupling 194 to a bell-crank 196 which in turn is pivoted on the bed-plate 54 at 197. The bell-crank 196 is rocked under the influence of a cam follower 198 which is journaled on one arm thereof and controlled by the cam 200 carried on the further auxiliary cam shaft 202. As seen best in Fig. 1, the cam shaft 202 is journaled at one end of the machine on appropriate bearings 204 and extends from the front to the rear of the machine frame 52. At the rear side of the machine, the auxiliary cam shaft 202 is coupled to the main cam shaft 148 by intermeshing bevel gears 206, 208 carried respectively on the shafts 202, 148. The cam follower 198 is urged into engagement with its transfer head operating cam 200 by provision of a coil spring 210 which tends to urge the bell-crank 196 in a counter-clockwise direction about the pivot 197 (see Fig. 3). Advantageously, the coupling link 194 is made of adjustable length so that the initial position of the transfer head 156 may be adjusted, if required.

By way of brief review, the stud transfer jaws 162, 164 close upon the wire by the actuation of the thrust member 176; and when closed, the entire transfer head 156 moves from the wire pick-up location at the cutter 44, 46 to the transfer location at the swaging mechanisms 36. After the swaging mechanisms operate and support the stud, as now will be described, the stud transfer jaws 162, 164 open and the transfer head 156 retracts to the position for pick-up of the next cut-off length of wire.

Reference will now be made to Figs. 1, 4 and 12 for the details of the swaging mechanisms 36 which receive the transferred stud, swages the rear end thereof, and supports the stud for pick-up by the weld transfer mechanisms 38. The swaging mechanisms 36 are supported on the bed-plate 54 from front to back of the machine frame and include a pair of swaging jaws 212, 214 which are pivoted at 216, 218 on a bifurcated support 220 having opposite walls 222, 224. As seen in the plan view of Fig. 1a, the jaws 212, 214 are arranged intermediate the walls 222, 224 and terminate at their forward ends in work-engaging portions which are adapted to engage the transferred stud when still supported by the stud transfer jaws 162, 164. The swaging jaws 212, 214 include integral rearward extensions 212a, 214a pivotally supporting rollers 226, 228. The swaging jaws are normally biased apart by a spring 230 which is interconnected between the extensions 212a, 214a and tend to urge the rollers 226, 228 toward each other. A pneumatically-controlled jaw operating mechanism is effective to periodically apply a large spreading force to the rollers 226, 228 whereby the work-engaging portions of the swaging jaws 212, 214 come together with sufficient force to flatten the rearward ends of successive studs brought into the swaging position. The operating mechanisms include a spreading member 232 which is interposed between the rollers 226, 228 and is formed with diverging camming surfaces 232a, 232b. In response to a power stroke imparted to the spreading member 232, which stroke pulls the spreading member 232 to the right in Fig. 4, the rollers 226, 228 are urged apart which brings the swaging jaws 212, 214 into contact with the stud. As the diverging camming surfaces 232a, 232b come between the rollers, the jaws 212, 214 swage the rearward portion of the stud to form the flattened ear or terminal P. The power stroke is imparted to the spreading member 232 by a pneumatic control 234 which includes a cylinder 234a and a piston shaft 234b connected via a yoke 236 to the spreading member 232. The cylinder is selectively posted by a two-way solenoid controlled valve 235 connected to the inlet conduits 237, 239. The valve is selectively energized by switches 241, 243 under control of the cam 245, 247. The details of the pneumatic control for closing and opening the swaging jaws will be described in conjunction with Figs. 13 and 14 of the drawings. For the present, it suffices to point out that the swaging jaws 212, 214 close onto successive studs brought into the swaging position to swage the rearward portions of the studs and to hold the studs for pick-up by the weld transfer mechanisms 38.

Referring now specifically to Figs. 1, 3 and 5, detailed reference will be made to the weld-transfer mechanisms 38 which pick up successive swaged studs from the swaging mechanisms 36 and advance the same along an axial thrust path at the welding position P to bring the studs, with their swaged ends rearmost, against the electrode body b with the requisite welding pressure. The weld transfer mechanisms 38 include a weld transfer head 236 which is carried on a hollow supporting shaft 238 for movement from front to rear of the machine and along a path substantially radially of the mandrel 30. The supporting shaft 238 is journaled on appropriate bearings 240 which are carried on the bed-plate 254 of the machine. The weld transfer head 236 includes a pair of weld transfer jaws 242, 244 (see Fig. 3) which are pivoted on supporting shafts 246, 248 carried between the front and rear body sections 236a, 236b of the welding head 236. The weld transfer jaws 242, 244 extend generally transverse to the thrust line or path P (that is, across the studs when supported by the swaging jaws 212, 214) and are normally biased apart by an interposed spring 250. The weld transfer jaws 242, 244 are urged toward each other and into gripping engagement with successive studs by a pair of rollers 252, 254 which are journaled at right angles to the pivots 246, 248. The rollers 252, 254 are adapted to be spread apart to close the weld transfer jaws 242, 244 by an interposed thrust member 256 which includes diverging camming surfaces progressively interposed between the rollers 252, 254 in response to movement of the thrust member through a forward stroke from the rear to the front of the machine, that is, from right to left in Fig. 5. The thrust member 256 is slidably received within the supporting shaft 238 and is actuated by a pneumatic control 258 which receives air from the inlet conduit 260 via a valve 262 connected in the pneumatic system. The valve 262 is controlled from a jaw actuating cam 264 (see Fig. 12) which is carried on the main cam shaft 148. The air valve 262 is normally closed and is opened under the influence of the cam 264 via the cam follower 266 which is carried on the cam follower arm 268. Accordingly, at the appropriate time in the cycle, the weld transfer jaws 242, 244 will close upon the stud supported by the swaging jaws and upon release of said stud from the swaging jaws, the completed stud will be transferred to and supported by the weld transfer jaws 242, 244.

Actuating mechanisms, generally designated by the reference numeral 270, are operatively connected to the weld transfer head 236 to advance the same through the required forward stroke to bring the leading end of the completed stud s into contact with the electrode body b on the mandrel 30 with the requisite welding pressure. The actuating mechanisms include a coupling member 272 fixed to the shaft 238 and engaged at its lower end on a guiding track 274. The coupling member 272 is connected to a bell-crank lever 276 which is pivoted on the machine frame at 278 via a coupling link including a weld-timing and pressure piston and cylinder 280. The bell-crank 276 is rocked in a counter-clockwise direction about the pivot 278 (as viewed in Fig. 5) by a cam follower 282 which rides upon a weld transfer actuating cam 284 carried on the main cam shaft 148. The cam follower 282 is urged into following contact with the cam 284 by a coil spring 286 which is operatively connected between the machine frame and the bell-crank 276 such that the bell-crank is urged in the clockwise direction about the pivot 278 (as viewed in Fig. 5). The weld transfer actuating mechanism 270 is arranged such that the drive from the cam 284 via the follower 282, the bell-crank 276, the linkage including the air cylinder 280 and the coupling member 272 are effective to bring the leading end of the stud s being transferred into the welding position with a slight spacing between the leading end of the stud and the electrode body b. Thereupon, the air cylinder 280 is operated to impart a short final travel to the stud whereby the weld timing and pressure may be accurately controlled by the air cylinder 280. As seen in Fig. 5, the air cylinder 280 includes a cylinder body 280a and a piston shaft 280b which is coupled via an appropriate collar 288 to a coupling pin 290 in the coupling member 272. The other end of the air cylinder 280 is connected via a further collar 292 to the upper end of the bell-crank lever 276. The air cylinder 280 received its air supply from an inlet conduit 294 which is connected in the pneumatic system via a solenoid controlled valve 296 which in turn is energized by the closing of a switch 297 under control of a cam 299 on the upper main cam shaft 148.

The weld transfer head 236 serves as one welding electrode or terminal. To this end, an appropriate braided cable 298 is connected from the welding equipment (not shown) to the welding transfer head 236. Accordingly, the welding head 236 is effectively isolated from the rest of the machine. This is achieved by employing insulating sleeves 300 within the bearings 240 which support the shaft 238, by interposing an insulating sheet 302 between the guide track 274 and the bed-plate 54, and by employing an insulating plug 304 as a mount for the pin 290 which couples the collar 288 to the member 272. The air inlet conduit 260 is made of an electrically insulating material. Thus, the welding head 236, its supporting shaft 238, the jaw closing thrust member 256, the coupling member 272 and the guide rail 274 are all electrically insulated from the rest of the machine.

Detailed reference will now be made to Figs. 1 and 6 to 11, inclusive, for a description of the work-support head, generally designated by the reference numeral 305, which supports rotate and axially displace the electrode body b in timed relation to operation of the stud forming transfer mechanisms. The work-support head 305 includes a mandrel 30 carried on a hollow mandrel supporting shaft 32 and arranged to present successive spaced locations about first and second circumferential paths of the electrode body at the welding position to receive successive studs formed internally of the machine. As seen best in Figs. 6 and 7, the mandrel 30 includes a hollow cylindrical mandrel body 306 which is longitudinally cut to form a series of internal gripping chucks which may be spread into locking contact with an electrode body b slipped onto the mandrel by the machine operator. The mandrel supporting shaft 32 is hollow and receives a thrust member 308 which, in response to rearward axial displacement relative to the body 306, causes the spreading of the gripping chucks or jaws of the body. The thrust member 308 terminates at its forward end in diverging camming surfaces 308a (see Fig. 7) which progressively engage the leading ends of the chuck jaws in response to the rearward displacement of the thrust member 308 to achieve the required locking action. The locking action is brought about by a coil spring 310 which is interposed between a shoulder 308b on the thrust member 308 and a shoulder 32b on the rearward end of the hollow mandrel supporting shaft 32. Normally, the spring 310 is held in compression between the shoulders 32b, 308b by a pneumatically-controlled piston and cylinder 312 having an inlet conduit 314 which is normally maintained under pressure and released at the beginning of the machine operating cycle to enable the spring 310 to lock the mandrel 30 to the electrode body b. The details of the pneumatic control 312 will be described in connection with Fig. 14. For the moment, it will suffice to point out that air is admitted to the pneumatic control 312 via a solenoid-controlled valve, the energization of which is determined by one of a bank of micro-switches actuated by one of a series of cams on a lower main cam shaft 320 (see Fig. 12) which turns once during each complete machine cycle. That is, while the upper main cam shaft 148 makes six revolutions in the completion of one studded electrode, the lower main cam shaft 320 makes one revolution to achieve certain control functions which occur only once during the entire sequence of machine operations.

The supporting shaft 32 for the mandrel 30 is coupled via a slip drive to a motor 322, with provision to allow the motor 322 to index the supporting shaft 32 at the prescribed time during the operating machine cycle. Specifically, and as seen best in Figs. 6 and 7, the motor 322 is supported beneath the bed-plate 54 of the machine and has its output shaft 322a coupled via an appropriate chain and sprocket 324 to an intermediate coupling shaft 326 which is journaled on appropriate bearings 328 fixed to the bed-plate. The coupling shaft 326 has a slidable connection or spline 329 to a further coupling shaft 330 which is journaled on appropriate bearings 332 fixed to a shiftable mandrel supporting carriage 348. The coupling shaft 330 is connected via a chain and sprocket 334 to the driving disc 336a of a slip clutch 336. The driving disc 336a is loosely journaled on the supporting shaft 32 and bears against a friction disc 336b for coupling to a driven disc 336c which is keyed to the shaft 32. The driven disc 336c is mounted for axial displacement on the shaft 32 and is urged into contact with the friction disc 336b and the driving disc 336a by a spring 338 which is interposed between the driven disc 336c and a collar 340 fixed to the supporting shaft 32. In the absence of any hold back effect on the supporting shaft 32, tending to cause the clutch 336 to slip, drive will be imparted to the supporting shaft 32 and the mandrel 30 will be rotated. However, the requisite hold back effect is exerted, except for the intervals when indexing is required, by a pawl and ratchet mechanism 342 (see Fig. 8) which is operatively connected to the mandrel supporting shaft 32 and periodically released to allow for the prescribed indexing. The pawl and ratchet mechanism 342 includes a ratchet wheel 344 having a number of circumferentially spaced notches 344a which may be engaged by the pawl 346. The pawl 346 is pivoted by a stud 350 on the rearward upstanding wall 348a of the shiftable mandrel supporting carriage 348. The spring 352 is connected between the rearward upstanding wall 348a of the carriage 348 and the pawl 346 to bias the pawl finger 346a in a counterclockwise direction about the stud or pivot 350 such that the pawl finger 346a engages within the successive complementary notches 344a of the ratchet wheel 344. The ratchet notches 344a in this embodiment are spaced at 120° intervals with respect to each other such that the mandrel 30 is rotated through an angle of 120° under the influence of the slip drive when the hold back effect on the supporting shaft 32 is released by the movement of the pawl finger 346a out of the particular notch 344a in which it is seated.

A pawl operating mechanism controlled from the main cam shaft 148 is operatively engaged with the pawl 346 to release the same from the ratchet 344 after the completion of a stud forming and welding cycle to enable the mandrel 30 to be indexed through the prescribed angular traverse under control of its slip clutch drive. The pawl actuating mechanism, as seen best in Figs. 1 and 8, includes an actuating shaft 354 which extends from side to side of the machine and is journaled at one end on an upstanding bracket 356 carried by the bed-plate 54 and at the other end on an appropriate bearing 358 carried by the standard of the bearing 328. Affixed to the actuating shaft 354 is an indexing plate 360 which is in contact with a roller 362 journaled on the lower end of the pawl 346. The actuating shaft 354, in response to clockwise rotation (see Fig. 8), causes the indexing plate 360 to pivot the pawl 346 about the pivot 350 to disengage the pawl finger 346a from the seating notch 344a. It will be appreciated by inspecting Fig. 6 that the index plate 360 is of a substantial width as compared to the roller 362 whereby it will make contact with the roller 362 as the latter is shifted along with the carriage 348, as will be subsequently described. Beyond the bearing 358, the actuating shaft 354 carries a crank arm 364 which is pivotally connected via a coupling rod 366 (see Fig. 1) to a bell-crank 368 pivoted on the bed-plate 54 by a bearing 370. The other arm of the bell-crank 368 carries a cam follower 372 which is in engagement with the indexing cam 374 on the main upper cam shaft 148. The actuating mechanism is arranged such that a thrust is imparted to the coupling link 366 urging the same from right to left in Fig. 1 whereby the crank arm pivots the actuating shaft 354 in the clockwise direction (see Fig. 8) to effect the required periodic operation of the pawl 346 for indexing of the mandrel.

The carriage 348, which includes the front and rear wall 348a, 348b and the connecting base 348c, is mounted for shifting from side to side (left and right in Fig. 6) by mounting the carriage or carrier 348 in an appropriate slideway 376 mounted on the bed-plate 54 of the machine. At the start of a machine cycle, the carriage 348 is in its retracted limit position, corresponding to the end of a cycle (see Figs. 16 and 21). The carriage 348 is then brought into the forward limit position of its side to side movement wherein the mandrel is disposed to receive the first circumferential row of studs (see Fig. 18 and 19). After the first row of studs are formed and welded in place, the carriage 348 is shifted into the retracted limit position of its side to side movement to bring the mandrel into position to receive the second circumferentially spaced row of studs (see Figs. 20, 21). The degree of carriage shifting, which may be controlled as detailed hereinafter, determines the axial spacing of the respective rows of studs in the final electrode assembly. Actuating mechanisms are connected to the carriage 348 for bringing the carriage into the forward limit position, and for retracting the same after completion of the first row or group of studs. The actuating mechanisms (see Fig. 6) include an actuating rod 378 which is coupled at one end by a collar 380 to an upstanding stud 382 on the carriage 348 and at the other end by a collar 384 to an actuating head 386 confined on the bed-plate 54 for side to side movement in a slideway 388. A pneumatic carriage shift control 390, including a cylinder and piston, is operatively connected to the actuating head 386. The piston and cylinder 390 are mounted on the bed-plate 54 with the piston shaft 390b connected to the actuating head 386. Air is selectively ported to one side or the other side of the piston head, as will be subsequently described in detail in conjunction with Fig. 14, by a solenoid controlled two-way valve 392 connected in the inlet conduits 394, 396.

Reference will now be made to Figs. 6, and 9 to 11, inclusive, for a description of the mechanisms associated with the combined reference and stripping flange 50 which is initially positioned as seen in Fig. 16, to provide a slant reference face against which the slant rear face f of the electrode body may be brought when initially mounted on the mandrel of the machine, which is then retracted to the position illustrated in Figs. 18, 19 and 20, wherein the flange does not interfere with the rotation of the mandrel during the welding of the first and second circumferentially-extending rows of studs to the electrode body and which is finally advanced through a stripping stroke to the extended position illustrated in Fig. 21 during which the flange is effective to remove the completed electrode from the mandrel. The reference flange is carried on a supporting shaft or rod 400 by a transversely-extending arm 402. The shaft or rod 400 is mounted on the mandrel shift carriage 348 by appropriate bearings 404 and terminates at its rearward end in a shoulder 400a. On the rod intermediate the shoulder 400a and the adjacent bearing 404 is a coil spring 406 which tends to urge the supporting shaft 400 to the left in Fig. 6. The position of the shaft 400 and of the combined reference and stripping flange 50 relative to the mandrel 30 is determined by a pneumatic control 408, shown in detail in Fig. 9. The pneumatic control is in the form of a double piston and cylinder which is connected in the pneumatic system by two inlet conduits 410, 412 having respective pressure relief valves 411, 413. The admission of air to the inlet conduit 410 is determined by a solenoid controlled valve 414, while the admission of air to the inlet conduit 412 is determined by a solenoid valve 416. The valves 412, 414 are coordinated into the overall pneumatic system and control as will be described in conjunction wtih Fig. 14.

Figure 9:
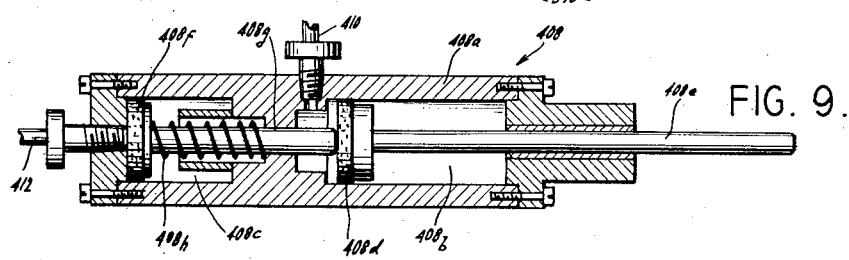
Fig. 9 is a longitudinal section taken substantially along the line of 9—9 of Fig. 1, showing the details of the pneumatic control for the combined reference and stripping flange associated with the mandrel.
Figure 10:
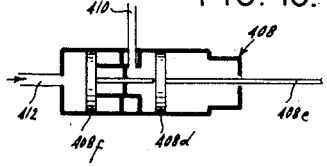
Fig. 10 is a diagrammatic showing of the pneumatic control of Fig. 9 illustrating the normal or at rest position of the pneumatic control, corresponding to the position of the reference and stripping flange in Fig. 6.
Figure 11:
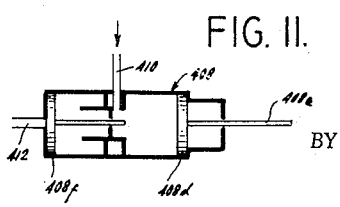
Fig. 11 is a view similar to Fig. 10 but showing the relative position of the pneumatic control when the reference and stripping flange is in the forwardly extended position corresponding to that illustrated diagrammatically in Fig. 21.

Referring now specifically to Figs. 9 to 11, inclusive, the pneumatic stripper control is seen to include a cylinder body 408a having a first piston chamber 408b and a second piston chamber 408c. In the piston chamber 408b is a piston 408d connected to a piston shaft 408e which bears against the shoulder 400a of the stripper supporting shaft 400. Within the piston chamber 408c is a piston head 408f which carries a piston shaft 408g which in turn bears against the piston head 408d in the chamber 408b. Surrounding the piston shaft 408g is a coil spring 408h which tends to bias the piston head 408f to the left in Fig. 9 and toward the end of the piston chamber in communication with the air inlet conduit 412. The piston shaft 408e in turn is biased to urge the piston head 408d against the piston shaft 408g by the spring 406 which tends to urge the piston shaft 408e to the left whereby the piston head 408d is at the end of the chamber 408b adjacent the air inlet conduit 410. At the beginning of the machine cycle, the stripping flange 50 is brought to the reference position illustrated in Fig. 16 by the admission of air through the inlet conduit 412 into the chamber 408c which urges the piston head 408f to the limit position determined by the construction of this piston and cylinder assembly. This limit position and the relative position of the double piston and cylinder pneumatic control 408 is illustrated diagrammatically in Fig. 10. During the actual machine cycle the parts of the pneumatic control 408 are in the relative position illustrated in Fig. 9 wherein the reference and stripping flange 50 is moved into the retracted position illustrated in Figs. 18 and 19 wherein the chucked electrode body b is free to rotate under control of its indexing drive. At the end of the machine cycle, air is admitted through the inlet conduit 410 into the chamber 408b driving the piston 408d to the limit of its stroke, as illustrated diagrammatically in Fig. 11. This movement in turn causes the stripping flange to move from the position illustrated in Fig. 20 to that illustrated in Fig. 21 during which forward stroke the completed electrode body is stripped from the supporting mandrel. The pneumatic control 408 and its coordination into the overall pneumatic and control system will be more thoroughly understood in conjunction with Fig. 14.

As previously detailed, the electrically isolated weld transfer head 236 serves as one welding terminal or electrode. The mandrel itself is intended to serve as the other welding terminal or electrode. To this end, a circular contact member 420 is carried on the conductive supporting shaft 32 for rotation therewith and a contact shoe 422 is arranged to make electrical contact with the contact member 420 at a time just prior to the application of welding pressure to a stud brought into the welding position P. The contact shoe 422 is spaced from the contact member 420 during the indexing intervals so as not to interfere with the rotation of the mandrel 30 through its prescribed angular traverse for welding of successive studs about the periphery of the electrode body supported thereon. The contact shoe 422 is pivotally supported on a rocker shaft 424 which is journaled on appropriate bearings carried by the shiftable carriage 348. As seen best in Figs. 6 and 8, the end of the rocker shaft 424 remote from the contact shoe 422 carries a rocker arm 426 which is coupled via a connecting link 428 to a cam follower arm 430. The connections between the rocker arm 426 and the cam follower arm 430 are such as to provide an effective coupling, yet allow for the shifting of the rocker shaft 424 and the contact shoe 422 with the mandrel. Accordingly the rocker operating mechanism will be effective to bring the contact shoe against the contact member or collar 420 in either of the limit positions of the carriage 348 in which limit positions the successive groups of studs are welded to the mandrel. The cam follower arm 430 is pivotally supported on a mounting shaft 432 which extends rearwardly and is journaled by appropriate bearings 434 on the upstanding supporting wall 58. The cam follower arm 430 carries a follower 436 which is urged into contact with the weld shoe control cam 438 by a spring (not shown). The development of the cam 438 is selected such that when successive studs are to be welded, the connecting link 428 is displaced upwardly to pivot the rocker arm 426 in the counter-clockwise direction in Fig. 8 which turns the rocker shaft 424 in the same direction, thereby bringing the contact shoe 422 against the contact member 420.

Figure 13:
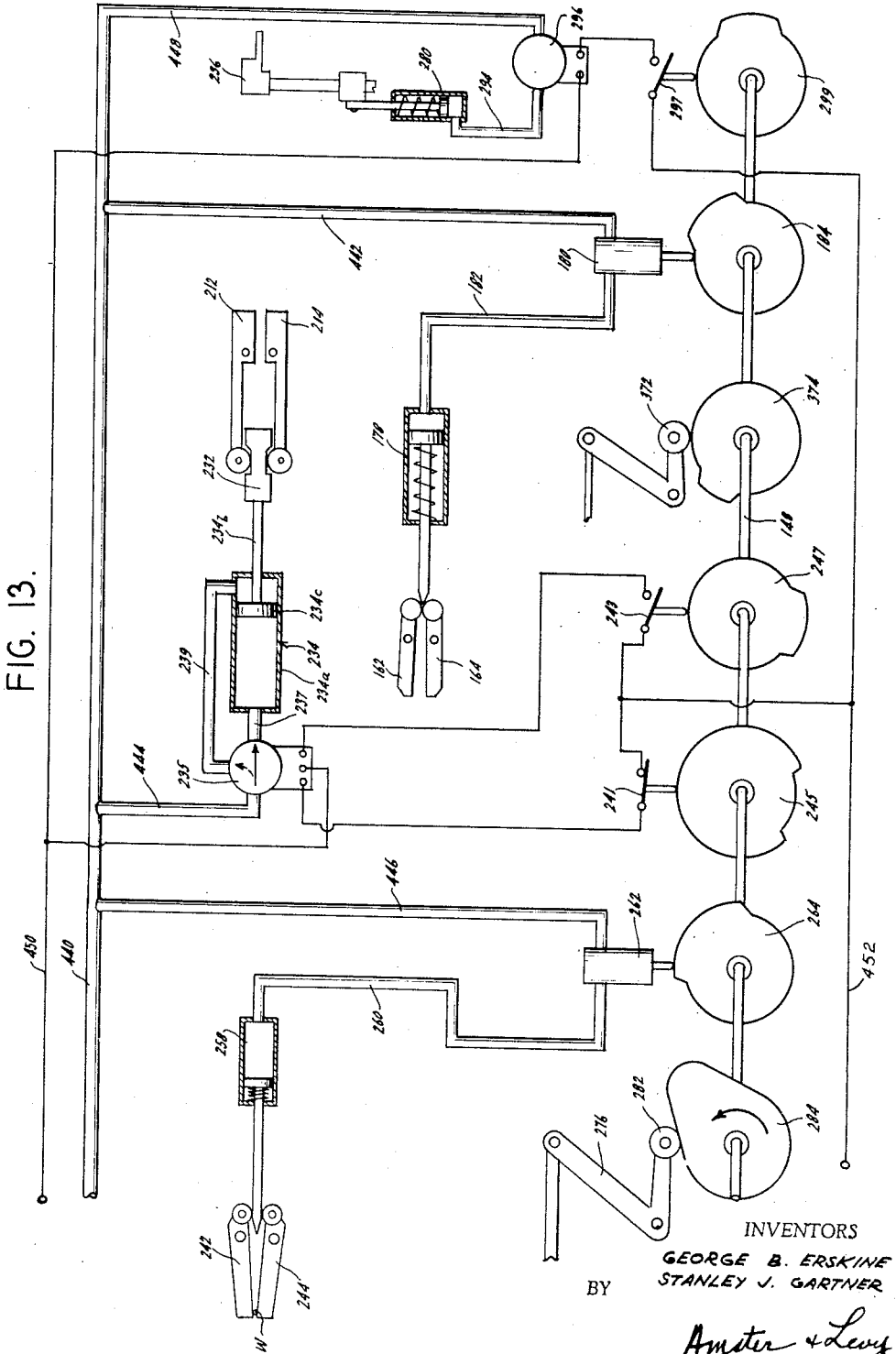
Fig. 13 is a combined schematic and diagrammatic showing of the several inter-related functions which occur during the forming, swaging, transferring and welding of each stud during a typical stud forming and welding cycle.

Detailed reference will now be made to the diagrammatic showing of Fig. 13, which will be supplemented by reference to other figures of the drawings for further description of the machine and a typical sequence in the forming, transferring and welding of one stud. The pneumatic system includes a main conduit 440 which is connected to an appropriate compressor (not shown) and includes a first branch 442 connected via the valve 180 to the inlet conduit 182 to the pneumatic control 178 of the stud transfer mechanisms, a second branch 444 connected via the valve 235 to the inlet conduits 237, 239 of the pneumatic control 234 for the swaging mechanisms, a third branch 246 connected via the valve 262 to the pneumatic control 258 of the weld transfer mechanisms, and a fourth branch 448 connected via the valve 296 to the inlet conduit 294 of the pneumatic control 280 for weld timing and pressure application.

The electrical system includes input lines 450, 452, the input lines 450, 452 selectively energize the solenoid-controlled valves 235, 296 via the switches 241, 243 and the switch 297.

For the sake of illustration, the several cams on the main cam shaft 148 have been turned at right angles to the cam shaft 148 so that the development of the cams may be seen and the relationship of the timing in a typical stud forming and welding cycle may be more fully appreciated. It is assumed that the cam shaft rotates in a direction to turn the cams counter-clockwise in the showing of Fig. 13, as shown by the directional arrow. At the start of operation, the mechanisms are in the position illustrated in Fig. 16 with a completed stud ready for transfer by the weld transfer mechanisms 38 and a length of the wire W advanced into position for cut-off and stud transfer. The sequence is substantially as follows:

The stud transfer jaw operating cam 184 opens the valve 180 to admit air under pressure into the pneumatic control 178 to close the stud transfer jaws 162, 164. The actuation of the stud transfer jaws is effective to advance the cut-off length of wire toward the swaging jaws 212, 214. During about the same time in the cycle, the weld transfer jaws 242, 244 are closed by the jaw operating cam 264 via the valve 260 and the pneumatic control 258 and the formed stud supported by the swaging jaws 212, 214 is transferred into the welding position P. When the completed stud is brought into the welding position, as illustrated in Fig. 18, the weld timing and pressure applying cam 299 closes its switch 297 to operate the solenoid control valve 296 to bring the stud into contact with the electrode body for welding. While the stud is being welded and prior to indexing, the swaging jaws 212, 214 close upon the transferred stud while supported by the stud transfer jaws 162, 164 to support the next completed stud in position for pickup by the weld transfer mechanism 38. The solenoid control valve 235 of the swaging mechanisms normally directs the air under pressure through the inlet conduit 237 under control of the normally closed switch 241 which is operated by the cam 245. When the swaging jaws are to close, cam 247 closes the switch 243 (and almost simultaneously the cam 245 opens the switch 241), whereupon the air is ported into the inlet conduit 39 for driving the piston shaft 234b through the power stroke for operation of the swaging jaws 212, 214. The illustrative showing in Fig. 13 is not intended to be an accurate portrayal of the development of the several cams on the shaft 148, but rather is intended to pictorially illustrate the various controls and to more or less indicate the timing as previously described in greater detail.

Figure 14:
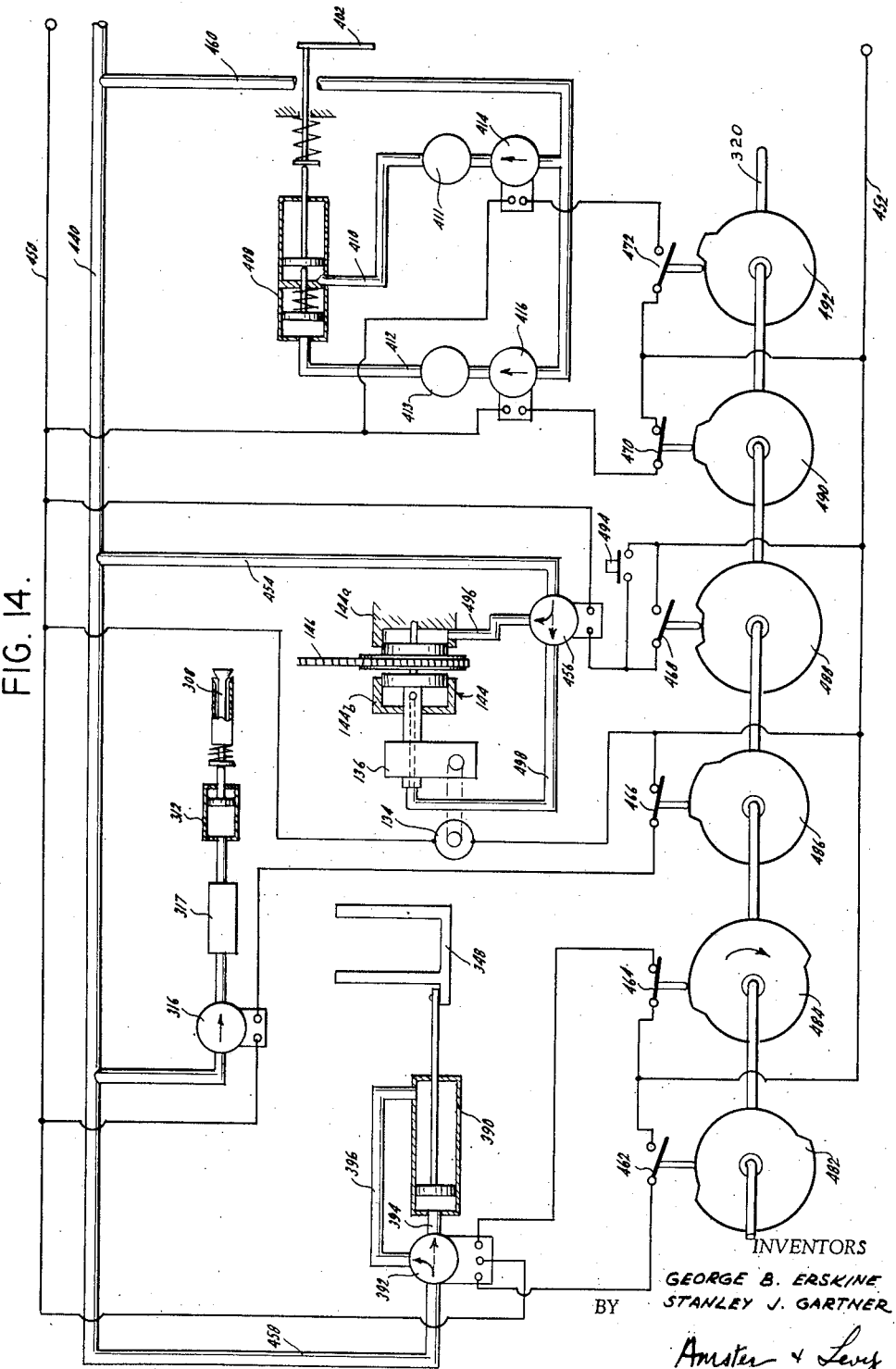
Fig. 14 is a combined schematic and diagrammatic showing of the various inter-related functions which occur at the beginning of, during and at the end of a complete operating cycle in the manufacture of a studded electrode by the present machine.

Reference will now be made to Figs. 12 and 14, supplemented from time to time by the showings in Figs. 1 to 11 of the drawings, for a description of the controls which are effective during the overall machine cycle for timing the required interrelated functions. As to the pneumatic system, the main air inlet conduit 440 includes a branch 454 for the two-position solenoid controlled valve 456 associated with the main brake and clutch 144 of the machine drive. A further branch 458 is connected to a two-position solenoid controlled valve 392 which controls the admission of air to the pneumatic control 390 for the shiftable mandrel carriage 348. A further branch 460 is connected to the solenoid controlled valves 414, 416 for the pneumatic stripper control 408.

The electrical input lines 450, 452 are connected to the solenoid controlled valves 316, 392, 414, 416 and 456 and the energization circuits for these valves are completed via a bank of cam controlled switches 462, 464, 466, 468, 470, 472 controlled by the cams 482, 484, 486, 488, 490 and 492 mounted on the lower cam shaft 320 (see Fig. 12). The switches 464, 466 and 470 are closed at the start of operation while the switches 462, 468 and 472 are open at the start of operation. The open switch 468 is by-passed by a push button start switch 494 which is seen in Fig. 1 to be in a location on the bench-like support adjacent the mandrel 30 and readily accessible to the operator. The push button start switch 494 is depressed to initiate operation, as will appear more fully hereinafter.

The lower cam shaft 320 which controls the overall machine cycle is coupled to and driven by the upper cam shaft 148 via an appropriate sprocket and gear coupling including a driving sprocket 500 (see Fig. 5) connected to the upper cam shaft 148, a driven sprocket 502 connected to a coupling shaft 504, a chain 506 trained over the sprockets 500, 502, a first spur gear 508 on the coupling shaft 504, and a second spur gear 510 in meshing engagement with the first spur gear and connected to the lower cam shaft 320. The gear reduction obtained via this coupling causes the lower cam shaft 320 to turn once during every six revolutions of the upper cam shaft for the illustrated electrode type.

In Fig. 14, the cams have been turned 90° relative to the cam shaft 320 and it is presumed that the cam shaft 320 is rotated in a direction to turn the respective cams in the clockwise direction, as indicated by the directional arrow. At the start of operation, the brake section 144a of the main drive is on since the valve 456 is arranged to normally connect the branch 454 to the inlet conduit 496. It will thus be appreciated that the machine is positively stopped at the completion of a machine cycle. The shiftable mandrel supporting carriage 348 is in the retracted position illustrated in Fig. 16, since the solenoid controlled valve 392 directs the air from the branch 458 through the inlet conduit 396 and into the piston and cylinder 390 to the right of the piston head. The pneumatic stripper control 408 is in the position illustrated in Fig. 10 wherein the combined reference and stripping flange 50 is arranged to serve as a reference for the electrical body b being placed on the mandrel 30. This is accomplished since the switch 470 is closed to cause the solenoid controlled valve 416 to admit fluid from the branch conduit 460 via the inlet conduit 412 into the appropriate chamber of the pneumatic stripper control 408.

At the start of operation, the operator (after placing an electrode body b on the mandrel) depresses the push button start switch 494 which engages the clutch 144b and disengages the brake 144a to impart drive to the machine. As the lower cam shaft 320 rotates, the cam 488 closes a switch 468 which by-passes the start button or switch 494 and allows the operator to release the start button for automatic cycling of the machine under control of the switch 468 which functions as the main or master control switch.

Almost instantaneously, the switch 466, under control of the cam 486, opens which in turn closes the solenoid controlled valve 316, thereby allowing the pneumatic control 312 to be connected to the atmosphere via the pressure relief valve 317. This allows the chuck to expand under the influence of its spring such that the mandrel 30 is locked to the electrode body b. When the mandrel is locked to the electrode body, the switch 470 under control of the cam 490, opens to close the solenoid controlled valve 416, thereby cutting off the air supply to the left-hand chamber of the stripper control 408 via the inlet conduit 412. The inlet conduit 412 is connected to the atmosphere via the pressure relief valve 413, thereby bringing the pneumatic control 408 to the position in Fig. 9 with the reference flange 50 retracted. This is the position which the reference flange occupies during almost the entire machine cycle until stripping is to be achieved at the end of the machine cycle.

Early in the cycle, the switch 462 is closed by the cam 482 and the switch 464 is opened by the cam 484 such that the solenoid controlled valve 392 is operated to introduce air from the branch 458 via the inlet conduit 394 to the left side of the piston head of the mandrel carriage control 390. This shifts the carriage 348 from the retracted position of Fig. 16 into the advanced position of Figs. 18 and 19 to receive the first group of studs.

After the first group of circumferentially extending studs are welded to the electrode body, the switch 462 opens under control of the cam 482 and the switch 464 closes under control of the cam 484 whereby the solenoid controlled valve 392 again applies air pressure to the air inlet conduit 396 which is effective via the pneumatic control 390 to retract the mandrel 30 through a prescribed axial travel to bring a further circumferential path about the electrode body into position for welding thereto of a group of studs. After the second group of studs are welded to the electrode body, the switch 472 closes under control of the cam 492 which operates the solenoid controlled valve 414 to connect the branch 460 to the inlet conduit 410 for the right-hand valve and piston of the pneumatic control 408. This is effective to drive the stripping flange 50 through the stripping stroke. After the stripping stroke is completed, the pressure relief valve 411 allows the right-hand piston to return to the rest position illustrated in Fig. 10 wherein the reference flange is oriented for the next machine cycle. The machine cycle is completed when the switch 468 opens under control of the cam 488.

The mechanisms and controls incorporated into our machine are such as to render the same readily convertible from one type of studding operation to another with a minimum amount of complexity and with a comparatively short change-over time. For example, if only two studs are to be welded at each circumferential location, the upper cam shaft is arranged to rotate four times for one rotation of the lower cam shaft and the mandrel indexing mechanism is arranged to index the mandrel through 180° in response to each rotation of the upper cam shaft. This change-over is essentially completed by changing the gearing between the upper and lower cam shafts and by replacing the ratchet wheel of the index mechanism.

If the relative spacing between the groups of circumferentially-extending studs is to be changed, it is a simple matter to change the degree of shift imparted to the carriage between the successive groups of stud forming and welding sequences. For the sake of convenience, the various cams employed throughout the machine are of the type which are removably mounted on their cam shafts so that they may be readily replaced by other cams in accordance with the desired timing and sequence for the formation of a particular type of studded electrode. The many and varied applications for our machine should be apparent to those skilled in the art from a consideration of the detailed description.

A latitude of modification, change and substitution is intended in the foregoing disclosure and in some instances, some features of the invention will be used without a corresponding use of other features. Accordingly, it is appropriate that the appended claims be construed broadly and in a manner consistent with the scope and spirit of the contribution herein.

What we claim is:

1. A machine for the manufacture of studded electrodes having a body and one or more radially-extending studs comprising a mandrel adapted to receive an electrode body, means mounting said mandrel for axial rotation to bring successive spaced locations along a circumferential path about said electrode body into a welding position, feed means for advancing successive lengths of stud wire to a transfer position laterally offset from said welding position, stud-transfer means engaging successive lengths of stud wire at said transfer position, a cutter operable after engagement of said stud-transfer means for cutting off successive lengths of said stud wire to form studs, actuating means for said stud-transfer means operable after cut-off of studs for advancing successive studs into a swaging position in alignment with said welding position, means operable at said swaging position for swaging the rear ends of successive studs, weld-transfer means engaging successive studs at said swaging position, actuating means for said weld-transfer mean operable after swaging of said studs for advancing successive studs lengthwise into said welding position in engagement with said electrode body, means for applying welding current through successive studs at said welding position, and means for periodically indexing said mandrel through a prescribed angular traverse to bring successive spaced locations about said electrode body into said welding position.

2. In a machine for the manufacture of studded electrodes having a body and one or more radially-extending studs, a mandrel adapted to receive an electrode body, feed means for advancing a length of stud wire to a cut-off and transfer position, stud-transfer means engaging said length of wire at said position, a cutter operable after engagement of said stud-transfer means for cutting off said length of said stud wire to form a stud, actuating means for said stud-transfer means operable after cut-off of said stud for advancing said stud into a swaging position, means operable at said swaging position for swaging the rear end of said stud, weld-transfer means engaging said stud at said swaging position, actuating means for said weld-transfer means operable after swaging of said stud for advancing said stud lengthwise into engagement with said electrode body, and means for applying welding current through said stud when in engagement with said body.

3. A machine for the manufacture of studded electrodes of the type having a body and one or more radially-extending studs comprising a mandrel adapted to receive an electrode body, means mounting said mandrel for axial rotation to bring prescribed spaced locations along a circumferential path about said electrode body into a welding position, stud-transfer means adapted to receive successive studs, actuating means for said stud-transfer means operable to advance successive studs into a swaging position in alignment with said welding position, means operable at said swaging position for swaging the rear ends of successive studs, weld-transfer means engaging successive studs at said swaging position, actuating means for said weld-transfer means operable after swaging of said studs for advancing successive studs lengthwise into said welding position in engagement with said electrode body, means for applying welding current through successive studs at said welding position, and means for periodically indexing said mandrel through a prescribed angular traverse to bring said prescribed spaced locations about said electrode into said welding position.

4. In a machine for the manufacture of studded electrodes having a body and one or more radially-extending studs, a mandrel adapted to receive an electrode body, stud-transfer means adapted to receive successive studs, actuating means for said stud-transfer means to advance successive studs into a swaging position, means operable at said swaging position for swaging the rear ends of successive studs, weld-transfer means engaging successive studs at said swaging position, actuating means for said weld-transfer means operable after swaging of said studs for advancing successive studs lengthwise into engagement with said electrode body, and means for applying welding current through successive studs when in engagement with said electrode body.

5. A machine for the manufacture of electrodes of the type including a cylindrical body and first and second groups of circumferentially-spaced, radially-extending studs comprising a mandrel mounted for axial rotation in a first position and for axial displacement through a prescribed stroke to a second position for further axial rotation, said mandrel being adapted to receive said body and to rotate the same in said first and second positions to bring spaced locations about first and second circumferential paths about said body into a welding position, stud-forming and transfer mechanisms arranged to transfer successive studs into contact with said body as the spaced locations about said first and second circumferential paths are brought into said welding position, means operatively connected to said mandrel for indexing the same in said first and second positions through prescribed angular traverses in timed relation to operation of said stud-forming and transfer mechanisms, means for applying welding current to successive studs brought into said welding position, and means operatively connected to said mandrel for axial displacing said mandrel through said prescribed stroke after welding of said first group of studs to said electrode about said first circumferential path.

6. A machine for the manufacture of studded electrodes of the type having a body and one or more radially-extending studs welded thereto comprising a mandrel adapted to receive an electrode body, means mounting said mandrel for axial rotation to bring prescribed spaced locations along a circumferential path about said electrode body into a welding position, stud-forming means arranged to bring successive studs into a transfer position laterally offset from said welding position, stud-transfer jaws adapted to engage successive studs at said transfer position, jaw-operating mechanisms for closing said stud-transfer jaws on successive studs, actuating means for said stud-transfer jaws operable to advance successive studs into a swaging position in alignment with said welding position, swaging jaws at said swaging position adapted to swage the rear ends of successive studs while held by said stud-transfer jaws, jaw-operating mechanisms for closing said swaging jaws on successive studs at said swaging position, the jaw-operating mechanisms and actuating means for said stud-transfer jaws being operable in a timed relation to the jaw-operating mechanisms for said swaging jaws whereby said swaging jaws support successive studs while said stud-transfer jaws open and return to engage the next stud, weld-transfer jaws adapted to engage successive studs at said swaging position, jaw-operating mechanisms for closing said weld-transfer jaws on successive studs when supported by said swaging jaws, the jaw-operating mechanisms for said swaging jaws being timed to release successive studs for transfer by said weld-transfer jaws, actuating means for said weld-transfer jaws operable after swaging of said studs for advancing successive studs lengthwise into said welding position in engagement with said body, means for applying welding current through successive studs at said welding position, and means for periodically indexing said mandrel through a prescribed angular traverse to bring said spaced locations about said electrode into said welding position.

7. In a machine for the manufacture of studded electrodes of the type having a body and one or more radially-extending studs welded thereto, a mandrel adapted to receive an electrode body which is to receive a stud at a prescribed circumferential position, stud-forming means arranged to bring successive studs into a transfer position laterally offset from said prescribed circumferential position, stud-transfer jaws adapted to engage successive studs at said transfer position, jaw-operating mechanisms for closing said stud-transfer jaws on successive studs, actuating means for said stud-transfer jaws operable to advance successive studs into a swaging position in alignment with said prescribed circumferential position, swaging jaws at said swaging position adapted to swage the rear ends of successive studs while held by said stud-transfer jaws, jaw-operating mechanisms for closing said swaging jaws on successive studs at said swaging position, the jaw-operating mechanisms and actuating means for said stud-transfer jaws being operable in a timed relation to the jaw-operating mechanisms for said swaging jaws whereby said swaging jaws support successive studs while said stud-transfer jaws open and return to engage the next stud, weld-transfer jaws adapted to engage successive studs at said swaging position, jaw-operating mechanisms for closing said weld-transfer jaws on successive studs when supported by said swaging jaws, the jaw-operating mechanisms for said swaging jaws being timed to release successive studs for transfer by said weld-transfer jaws, and actuating means for said weld-transfer jaws operable after swaging of said studs for advancing successive studs lengthwise into said welding position in engagement with said body.

8. A machine for the manufacture of studded electrodes of the type having a body and first and second groups of radially-extending studs welded thereto comprising a mandrel adapted to receive an electrode body, means mounting said mandrel for axial rotation and for axial displacement to bring prescribed spaced locations along first and second circumferential paths about said electrode into a welding position, stud-forming means arranged to bring successive studs into a transfer position laterally offset from said welding position, stud-transfer jaws adapted to engage successive studs at said transfer position, jaw-operating mechanisms for closing said stud-transfer jaws on successive studs, actuating means for said stud-transfer jaws operable to advance successive studs into a swaging position in alignment with said welding position, swaging jaws at said swaging position adapted to swage the rear ends of successive studs while held by said stud-transfer jaws, jaw-operating mechanisms for closing said swaging jaws on successive studs at said swaging position, the jaw-operating mechanisms and actuating means for said stud-transfer jaws being operable in a timed relation to the jaw-operating mechanisms for said swaging jaws whereby said swaging jaws support successive studs while said stud-transfer jaws open and return to engage the next stud, weld-transfer jaws adapted to engage successive studs at said swaging position, jaw-operating mechanisms for closing said weld-transfer jaws on successive studs when supported by said swaging jaws, the jaw-operating mechanisms for said swaging jaws being timed to release successive studs for transfer by said weld-transfer jaws, actuating means for said weld-transfer jaws operable after swaging of said studs for advancing successive studs lengthwise into said welding position in engagement with said body, means for applying welding current through successive studs at said welding position, means for periodically indexing said mandrel through a prescribed angular traverse to bring said spaced locations about said electrode into said welding position, and means for periodically displacing said mandrel axially through a prescribed stroke.

9. A machine for the manufacture of studded electrodes of the type having a body and one or more groups of radially-extending studs welded thereto comprising a mandrel adapted to receive an electrode body, means mounting said mandrel for axial rotation and for axial displacement to bring prescribed spaced locations along one or more circumferential paths about said electrode into a stud-receiving and welding position, stud-forming means arranged to bring successive studs into a transfer position, a stud-transfer mechanism adapted to engage successive studs at said transfer position and including operating means for engaging said stud-transfer mechanism on successive studs, actuating means for said stud-transfer mechanism operable to advance successive studs into a swaging position in alignment with said welding position, a swaging mechanism at said swaging position adapted to close on and swage the rear ends of successive studs while held by said stud-transfer mechanism and including operating means for closing said swaging mechanism on successive studs at said swaging position, the operating means and actuating means for said stud-transfer mechanism being operable in a timed relation to the operating means for said swaging mechanism whereby the latter supports successive studs while said stud-transfer mechanism returns to engage the next stud, a weld-transfer mechanism adapted to engage successive studs at said swaging position and including operating means for engaging said weld-transfer mechanism on successive studs when supported by said swaging mechanism, the operating means for said swaging mechanism being timed to release successive studs for transfer by said weld-transfer mechanism, actuating means for said weld-transfer mechanism operable after swaging of said studs for advancing successive studs lengthwise into said welding position in engagement with said body, means for applying welding current through successive studs at said welding position, means for periodically indexing said mandrel through a prescribed angular traverse to bring said spaced locations about said electrode into said welding position, and means operable in timed relation to the indexing means for periodically axially displacing said mandrel through a prescribed stroke.

10. A machine for the manufacture of studded electrodes of the type having a body and one or more radially-extending studs welded thereto comprising a mandrel adapted to receive an electrode body, means mounting said mandrel for axial rotation to bring prescribed spaced locations along a circumferential path about said electrode into a stud-receiving and welding position, stud-forming means arranged to bring successive studs into a transfer position, a stud-transfer mechanism adapted to engage successive studs at said transfer position and including operating means for engaging said stud-transfer mechanism on successive studs, actuating means for said stud-transfer mechanism operable to advance successive studs into a swaging position in alignment with said welding position, a swaging mechanism at said swaging position adapted to close on and swage the rear ends of successive studs while held by said stud-transfer mechanism and including operating means for closing said swaging mechanism on successive studs at said swaging position, the operating means and actuating means for said stud-transfer mechanism being operable in a timed relation to the operating means for said swaging mechanism whereby the latter supports successive studs while said stud-transfer mechanism returns to engage the next stud, a weld-transfer mechanism adapted to engage successive studs at said swaging position and including operating means for engaging said weld-transfer mechanism on successive studs when supported by said swaging mechanism, the operating means for said swaging mechanism being timed to release successive studs for transfer by said weld-transfer mechanism, actuating means for said weld-transfer mechanism operable after swaging of said studs for advancing successive studs lengthwise into said welding position in engagement with said body, means for applying welding current through successive studs at said welding position, and means for periodically indexing said mandrel through a prescribed angular traverse to bring said spaced locations about said electrode into said welding position.

11. A machine for the manufacture of electrodes of the type including a cylindrical body and a group of circumferentially spaced, radially-extending studs welded thereto comprising a mandrel mounted for axial rotation and adapted to receive said body and to rotate the same to bring spaced locations about said circumferential path into a welding position, a swaging station, stud-transfer means for supporting studs in position to be engaged by and worked upon by at said swaging station, swaging mechanisms at said swaging station including a pair of swaging jaws, means mounting said swaging jaws for pivotal movement into a swaging position relative to each other, spring means operatively connected to and biasing said swaging jaws out of said swaging position, and means operatively connected to said swaging jaws and movable through a powerstroke for driving said swaging jaws into said swaging position, weld transfer mechanisms arranged to transfer successive studs from said swaging station into said welding position in contact with said body, means operatively connected to said mandrel for indexing the same through prescribed angular traverses in timed relation to operation of said stud-transfer mechanisms, and means for applying welding current to successive studs brought into said welding position.

12. In a machine for the manufacture of electrodes of the type including a cylindrical body and a group of circumferentially spaced, radially-extending studs welded thereto, a mandrel adapted to receive said body, a swaging station, stud-transfer means for supporting studs in position to be engaged by and worked upon by at said swaging station, swaging mechanisms at said swaging station including a pair of swaging jaws, means mounting said swaging jaws for pivotal movement into a swaging position relative to each other, spring means operatively connected to and biasing said swaging jaws out of said swaging position, and means operatively connected to said swaging jaws and movable through a power stroke for driving said swaging jaws into said swaging position, weld transfer mechanisms arranged to transfer successive studs from said swaging station into said welding position in contact with said body, and means for applying welding current to the stud brought into said welding position.

13. In a machine for the manufacture of electrodes of the type including a cylindrical body and a first and second group of circumferentially spaced, radially-extending studs, a mandrel mounted for axial rotation in a first position and for axial displacement through a prescribed stroke to a second position, a combined reference and stripper flange mounted on said mandrel for retractable and extensible movement relative to a reference position, said mandrel being adapted to receive said body and to rotate the same in said first and second positions to bring spaced locations about first and second circumferential paths into a welding position, stud-forming and transfer mechanisms arranged to transfer successive studs into said welding position in contact with said body at the spaced locations about said first and second circumferential paths, means operatively connected to said mandrel for indexing the same in said first and second positions through a prescribed angular traverse in timed relation to operation of said stud-forming and transfer mechanisms, actuating means operatively connected to said reference and stripper flange for retracting the same from said reference position before indexing of said mandrel, means for applying welding current to successive studs brought into said welding position, means operatively connected to said mandrel for axially displacing said mandrel through said prescribed stroke after welding of said first group of studs to said electrode about said first circumferential path.

14. A machine for the manufacture of electrodes of the type including a cylindrical body and a first and second group of circumferentially spaced, radially-extending studs comprising a mandrel mounted for axial rotation in a first position and for axial displacement through a prescribed stroke to a second position, a combined reference and stripper flange mounted on said mandrel for retractable and extensible movement relative to a reference position, said mandrel being adapted to receive said body and to rotate the same in said first and second positions to bring spaced locations about first and second circumferential paths into a welding position, stud-forming and transfer mechanisms arranged to transfer successive studs into said welding position in contact with said body at the spaced locations about said first and second circumferential paths, means operatively connected to said mandrel for indexing the same in said first and second positions through a prescribed angular traverse in timed relation to operation of said stud-forming and transfer mechanisms, actuating means operatively connected to said reference and stripper flange to retract the same from said reference position before indexing of said mandrel, means for applying welding current to successive studs brought into said welding position, means operatively connected to said mandrel for axial displacing said mandrel through said prescribed stroke after welding of said first group of studs to said electrode about said first circumferential path, the actuating means for said reference and stripper flange being arranged to extend the same after welding of the first and second groups of studs to said body.

15. In a machine for the manufacture of electrodes of the type including a cylindrical body and a group of circumferentially spaced, radially-extending studs welded thereto, a mandrel mounted for axial rotation and adapted to receive said body and to rotate the same to bring spaced locations about a circumferential path into a welding position, and a weld transfer mechanism arranged to transfer successive studs into said welding position in contact with said body at the spaced locations about said circumferential path, said weld-transfer mechanism including a pair of transfer jaws, means rockably mounting said transfer jaws for movement into a closed position in engagement with an interposed stud, operating means for periodically moving said transfer jaws into said closed position, and actuating means for periodically moving said transfer jaws through a prescribed thrust toward said mandrel to bring the leading end of the supported stud into contact with said body.

16. In a machine for the manufacture of electrodes of the type including a cylindrical body and a group of circumferentially spaced, radially-extending studs welded thereto, a mandrel mounted for axial rotation and adapted to receive said body and to rotate the same to bring spaced locations about a circumferential path into a welding position, a weld-transfer mechanism arranged to transfer successive studs into said welding position in contact with said body at the spaced locations about said circumferential path, said weld-transfer mechanism including a pair of transfer paws, means rockably mounting said transfer jaws for movement into a closed position in engagement with an interposed stud, operating means for periodically moving said transfer jaws into said closed position, and actuating means for periodically moving said transfer jaws through a prescribed thrust toward said mandrel to bring the leading end of the supported stud into contact with said body, means electrically insulating said weld-transfer mechanism from the remainder of said machine, and means for applying welding current to said stud when in contact with said body including a source of welding current having an electrical connection to said weld-transfer mechanism and a contact shoe movable into electrical contact with said mandrel after movement of said transfer jaws through said prescribed thrust.

17. In a machine for the manufacture of studded electrodes, a mandrel adapted to receive an electrode body and including a hollow cylindrical mandrel body adapted to be expanded into locking engagement with said electrode body, a carrier for said mandrel mounting said mandrel for periodic advance from a first position at which studs are welded to said electrode body to an axially displaced second position at which further studs are welded to said electrode body, means mounting said mandrel on said carrier for rotation in said first and second positions whereby successive spaced locations about the circumference of said electrode body may be brought into position to have studs welded thereto, an indexing drive operatively connected to said mandrel for periodically rotating said mandrel to bring said successive spaced locations in said position, and carrier-advancing means operatively connected to said carrier for moving said mandrel between said first and second positions.

18. In a machine for the manufacture of studded electrodes, a mandrel adapted to receive an electrode body and including a hollow cylindrical mandrel body having a series of gripping chucks adapted to be expanded into locking engagement with said electrode body, an expanding member disposed within said mandrel body and arranged to expand said chucks in response to axial displacement of said expanding member relative to said mandrel body, means operatively connected to said expanding member to axially displace said expanding member for locking said gripping chucks in engagement with said electrode body, a carrier for said mandrel mounting said mandrel for periodic advance from a first position at which studs are welded to said electrode body to an axially displaced second position at which further studs are welded to said electrode body, means mounting said mandrel on said carrier for rotation in said first and second positions whereby successive spaced locations about the circumference of said electrode body may be brought into position to have studs welded thereto, an indexing drive operatively connected to said mandrel for periodically rotating said mandrel to bring said successive spaced locations into said position, and carrier-advancing means operatively connected to said carrier for moving said mandrel between said first and second positions.

19. In a machine for the manufacture of studded electrodes, a mandrel adapted to receive an electrode body and including a mandrel body adapted to be expanded into locking engagement with said electrode body, a carrier for said mandrel mounting said mandrel for periodic advance from a first position at which studs are welded to said electrode body to an axially displaced second position at which further studs are welded to said electrode body, means mounting said mandrel on said carrier for rotation in said first and second positions whereby successive spaced locations about the circumference of said electrode body may be brought into position to have studs welded thereto, an indexing drive operatively connected to said mandrel for periodically rotating said mandrel to bring said successive spaced locations in said position, and carrier advancing means operatively connected to said carrier for moving said mandrel between said first and second positions, said indexing drive including a mandrel-supporting shaft, a driver having a slip clutch connection to said shaft, an indexing control connected to said shaft and normally causing slip between said drive and said shaft whereby said mandrel is not rotated, and means for periodically releasing said index control whereby a driving connection is provided between said driver and said shaft.

20. A machine for the manufacture of studded electrodes having a body and one or more radially-extending studs comprising a mandrel adapted to receive an electrode body, means mounting said mandrel for axial rotation to bring successive spaced locations along a circumferential path about said electrode body into a welding position, means for advancing successive lengths of stud wire to a transfer position laterally offset from said welding position, stud-transfer means engaging successive lengths of stud wire at said transfer position, a cutter operable after engagement of said stud-transfer means for cutting off successive lengths of said stud wire to form studs, actuating means for said stud-transfer means operable after cut off of studs for advancing successive studs into a further transfer position in alignment with said welding position, means operable at said further transfer position for swaging the rear ends of successive studs, weld-transfer means engaging successive studs at said swaging position, actuating means for said weld-transfer means operable after swaging of said studs for radially advancing successive studs lengthwise into said welding position in engagement with said electrode body, means for applying welding current through successive studs at said welding position, and means for periodically indexing said mandrel through a prescribed angular traverse to bring successive spaced locations about said electrode body into said welding position.

21. A machine according to claim 20 wherein said stud-transfer means includes transfer jaws positioned to receive successive lengths of stud wire and operating means for bringing said transfer jaws into engagement with said successive lengths.

22. In a machine for the manufacture of electrodes of the type including a cylindrical body and at least one group of circumferentially spaced, radially-extending studs, a mandrel mounted for axial rotation, a combined reference and stripper flange mounted on said mandrel for retractile and extensile movement relative to a reference position, said mandrel being adapted to receive said body and to rotate the same to bring spaced locations about a circumferential path into a welding position, stud forming and transfer mechanisms arranged to transfer successive studs into said welding position and into contact with said body at the spaced locations about said circumferential path, means operatively connected to said mandrel for indexing the same through a prescribed angular traverse in timed relation to operation of said stud forming and transfer mechanisms, and actuating means operatively connected to said reference and stripper flange to retract the same from said reference position before indexing of said mandrel.

23. In a machine for the manufacture of electrodes of the type including a cylindrical body and a group of circumferentially spaced, radially-extending studs welded thereto, a mandrel mounted for axial rotation and adapted to receive said body and to rotate the same to bring spaced locations about a circumferential path into a welding position, weld transfer mechanisms including transfer jaws arranged to transfer successive studs into said welding position in contact with said body at the spaced locations about said circumferential path, actuating means for periodically moving said transfer jaws through a prescribed thrust toward said mandrel to bring the leading end of the supported stud into contact with said body, means electrically insulating said weld transfer mechanisms from the remainder of said machine, and means for applying welding current to said stud when in contact with said body including a source of welding current having an electrical connection to said weld transfer mechanism and a contact shoe movable into electrical contact with said mandrel after movement of said transfer jaws through said prescribed thrust.

24. In a machine for the manufacture of studded electrodes of the type having a body and one or more groups of radially-extending studs welded thereto, a mandrel adapted to receive an electrode body, means mounting said mandrel for axial rotation and for axial displacement to bring prescribed spaced locations along one or more circumferential paths about said electrode into a stud-receiving and welding position, stud-forming means arranged to bring successive studs into a transfer position, a stud-transfer mechanism adapted to engage successive studs at said transfer position and including operating means for engaging said stud-transfer mechanism on successive studs, actuating means for said stud-transfer mechanism operable to advance successive studs into a further stud transfer position in alignment with said welding position, a weld-transfer mechanism adapted to engage successive studs at said further transfer position and including operating means for engaging said weld-transfer mechanism on successive studs, actuating means for said weld-transfer mechanism operable after advance of said studs into said further transfer position for advancing successive studs lengthwise into said welding position in engagement with said body, means for applying welding current through successive studs at said welding position, means for periodically indexing said mandrel through a prescribed angular traverse to bring said spaced locations about said electrode into said welding position.

25. A method for the manufacture of a studded electrode having a body and one or more radially-extending studs welded thereto including the steps of feeding a length of wire along a feeding path parallel to and spaced from a welding path extending axially of said body, engaging said length of wire while along said feeding path to provide a temporary support for said length, cutting off said length of wire while engaged by said temporary support to form a stud and transferring said stud laterally from along said feeding path to a swaging position along said welding path, swaging the rearward end of said stud while along said welding path to provide a flattened ear on said rearward end and engaging said flattened ear to provide a further temporary support for said stud, engaging said stud forwardly of said flattened ear for transfer of said stud along said welding path, releasing said further temporary support and transferring said stud along said welding path to bring the forward end of said stud into contact with said body, and welding said stud to said body.

References Cited in the file of this patent

UNITED STATES PATENTS

| | | |
|---|---|---|
| 151,215 | Fox | May 26, 1874 |
| 427,678 | Gartze | May 13, 1890 |
| 1,241,253 | Morgan | Sept. 25, 1917 |
| 1,241,254 | Payne et al. | Sept. 25, 1917 |
| 1,642,825 | Pearce | Sept. 20, 1927 |
| 1,696,455 | Rupley | Dec. 25, 1928 |
| 2,734,119 | Pityo | Feb. 7, 1956 |
| 2,806,934 | Anderson et al. | Sept. 17, 1957 |